US009987825B2

(12) United States Patent
Izumi et al.

(10) Patent No.: US 9,987,825 B2
(45) Date of Patent: Jun. 5, 2018

(54) JOINED BODY AND METHOD FOR MANUFACTURING THE SAME

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days. days.

(21) Appl. No.: 14/873,263

(22) Filed: Oct. 2, 2015

(65) Prior Publication Data

US 2016/0096342 A1    Apr. 7, 2016

Related U.S. Application Data

(60) Provisional application No. 62/075,397, filed on Nov. 5, 2014, provisional application No. 62/059,209, filed on Oct. 3, 2014.

(51) Int. Cl.

| | |
|---|---|
| *H01R 4/02* | (2006.01) |
| *B32B 7/12* | (2006.01) |
| *C04B 37/02* | (2006.01) |
| *C04B 38/00* | (2006.01) |
| *B32B 3/12* | (2006.01) |
| *B32B 9/00* | (2006.01) |
| *B32B 9/04* | (2006.01) |

(Continued)

(52) U.S. Cl.
CPC .................. *B32B 7/12* (2013.01); *B32B 3/12* (2013.01); *B32B 9/005* (2013.01); *B32B 9/04* (2013.01); *B32B 15/04* (2013.01); *B32B 15/20* (2013.01); *C04B 35/26* (2013.01); *C04B 37/005* (2013.01); *C04B 37/023* (2013.01); *C04B 38/0006* (2013.01); *C04B 38/0012* (2013.01); *C23C 4/12* (2013.01); *H01R 4/58* (2013.01); *B32B 2307/202* (2013.01); *C04B 2237/068* (2013.01); *C04B 2237/123* (2013.01)

(58) Field of Classification Search
CPC ...... F01N 3/2828; F01N 3/2026; B01J 35/04; B01J 19/2485; H05B 3/42; B32B 7/12; B32B 3/12; B32B 9/005; B32B 15/04; B32B 15/20; C04B 35/26
USPC ........................................................ 174/94 R
See application file for complete search history.

(56) References Cited

U.S. PATENT DOCUMENTS 3,329,516 A     7/1967  Chvatal et al.
4,629,662 A *  12/1986  Brownlow ............... C03C 17/36
                                                              204/192.15
(Continued)

FOREIGN PATENT DOCUMENTS

EP     0 182 128 A2     5/1986
EP     0 572 343 A1    12/1993
(Continued)

OTHER PUBLICATIONS

U.S. Appl. No. 14/873,311, filed Oct. 2, 2015, Izumi, et al.
(Continued)

*Primary Examiner* — Steven T Sawyer
(74) *Attorney, Agent, or Firm* — Burr & Brown, PLLC

(57) ABSTRACT

A joined body 20 includes a first member 21, a second member 22, and a joint portion 30 which is formed from an oxide ceramic containing a $Fe_3O_4$ phase in which a solute component capable of forming a spinel-type oxide with Fe is solid-dissolved and which joins the first member 21 and the second member 22.

19 Claims, 7 Drawing Sheets

(51) Int. Cl.
  *B32B 15/04* (2006.01)
  *B32B 15/20* (2006.01)
  *C04B 37/00* (2006.01)
  *C23C 4/12* (2016.01)
  *H01R 4/58* (2006.01)
  *C04B 35/26* (2006.01)

(56) References Cited

U.S. PATENT DOCUMENTS

| | | | | |
|---|---|---|---|---|
| 6,890,665 | B1* | 5/2005 | Tanida | C22C 38/02 |
| | | | | 148/246 |
| 8,137,802 | B1* | 3/2012 | Loehman | B32B 9/005 |
| | | | | 428/325 |
| 2012/0076699 | A1* | 3/2012 | Ishihara | B01J 19/2485 |
| | | | | 422/174 |
| 2013/0043236 | A1 | 2/2013 | Sakashita et al. | |
| 2015/0158016 | A1 | 6/2015 | Mori et al. | |
| 2015/0344041 | A1* | 12/2015 | Green | B32B 9/047 |
| | | | | 428/77 |
| 2016/0002110 | A1 | 1/2016 | Izumi et al. | |
| 2016/0046531 | A1 | 2/2016 | Izumi et al. | |

FOREIGN PATENT DOCUMENTS

| | | |
|---|---|---|
| JP | 06-001670 A1 | 1/1994 |
| JP | 2001-220252 A1 | 8/2001 |
| JP | 2011-099405 A1 | 5/2011 |
| JP | 2011-246340 A1 | 12/2011 |
| JP | 2014-062476 A1 | 4/2014 |
| WO | 2011/125815 A1 | 10/2011 |
| WO | 2014/148534 A1 | 9/2014 |

OTHER PUBLICATIONS

U.S. Appl. No. 14/873,327, filed Oct. 2, 2015, Izumi et al.
U.S. Appl. No. 14/873,348, filed Oct. 2, 2015, Izumi et al.
U.S. Appl. No. 14/873,291, filed Oct. 2, 2015, Izumi et al.
Extended European Search Report (Application No. 15188204.0) dated Feb. 12, 2016.
U.S. Appl. No. 14/848,938, filed Sep. 9, 2015, Izumi, et al.
U.S. Appl. No. 14/856,629, filed Sep. 17, 2015, Izumi, et al.

* cited by examiner

JOINED BODY AND METHOD FOR MANUFACTURING THE SAME

The present application claims priority from U.S. provisional application No. U.S. 62/059,209 filed on Oct. 3, 2014, and U.S. provisional application No. U.S. 62/075,397 filed on Nov. 5, 2015, the entire contents of both of which are incorporated herein by reference.

BACKGROUND OF THE INVENTION

1. Field of the Invention

The present invention relates to a joined body and a method for manufacturing the same.

2. Description of the Related Art

Hitherto, as a joined body, a joined body in which a pair of electrodes each formed of a metal layer is provided on a surface of a honeycomb body formed of a porous ceramic has been proposed (for example, see Patent Literature 1). According to this joined body, the metal layer contains Cr and/or Fe, a diffusion layer formed of a metal silicide is present at a boundary portion with the honeycomb body, and the reliability of the electrical connection is ensured in a high-temperature environment. In addition, as the joined body, a joined body has been proposed in which pores of a porous ceramic are filled with a ceramic, and a metal component is joined to the porous ceramic with an active metal-containing solder material interposed therebetween (for example, see Patent Literature 2). In this joined body, the porous ceramic and the metal component are joined to each other using a Ag—Cu eutectic crystal. Furthermore, as the joined body, a joined body in which a ceramic member formed of a silicon nitride sintered body and a metal member are joined to each other with a buffer layer interposed therebetween has been proposed (for example, see Patent Literature 3). In this joined body, the buffer layer is configured so that a silicon nitride sintered body layer containing 5 to 20 percent by mass of a nitride of an active metal, a low-Young's modulus metal layer formed of a transition metal and an alloy thereof, and a silicon nitride sintered body layer containing 25 to 70 percent by mass of a nitride of an active metal are sequentially arranged.

As a honeycomb structural body, an exhaust gas cleaning apparatus has been proposed in which the thickness of a partition wall of a cylindrical carrier is set so that electrical resistances of all current paths between terminals are equal to each other, and the cylindrical carrier is heated by supplying electricity thereto through electrodes to increase the temperature of a catalyst supported by the carrier to its active temperature (for example, see Patent Literature 4). It has been disclosed that according to this structural body, the carrier is uniformly heated, and even at cold start of an engine, the catalyst supported by the carrier can be heated to the active temperature. In addition, as the honeycomb structural body, a honeycomb structural body has been proposed in which from a composite material containing $MoSi_2$ and at least one type of Si and SiC, electrode films, electrode terminals, and a substrate are manufactured (for example, see Patent Literature 5). It has been disclosed that this structural body can be configured to have a low volume resistivity and a low temperature dependence thereof as compared to those of SiC, SiC—Si, or the like. Furthermore, as the honeycomb structural body, a honeycomb structural body has been proposed in which a pair of electrode portions is formed so that each electrode portion has a belt shape extending in a cell formation direction (for example, see Patent Literature 6). It has been proposed that in this structural body, the electrode is formed using SiC or Si.

CITATION LIST

Patent Literature

[Patent Literature 1] JP 2011-246340 A
[Patent Literature 2] JP 2001-220252 A
[Patent Literature 3] JP 6-1670 A
[Patent Literature 4] JP 2011-99405 A
[Patent Literature 5] JP 2014-62476 A
[Patent Literature 6] WO 2011/125815 A1

SUMMARY OF THE INVENTION

However, since a joining layer of each of the joined bodies disclosed in Patent Literatures 1 to 3 is formed of a metal, there have been problems, such as a low heat resistance, a low oxidation resistance, and a low joining reliability.

In the honeycomb structural bodies disclosed in Patent Literatures 4 to 6, although Cu, Al, Si, and/or the like is used as an electrode material, the heat resistance and the oxidation resistance are still not sufficient. In Patent Literature 5, although $MoSi_2$ is used, Mo may be selectively oxidized at 300° C. to 600° C. in some cases, and the heat resistance and the oxidation resistance are still not sufficient. Accordingly, the electrically conductive properties may be degraded, and/or the heat generation distribution may become uneven in some cases.

The present invention was made in consideration of the problems described above, and a primary object of the present invention is to provide a joined body in which two members can be more easily and more reliably joined to each other and a method for manufacturing the joined body. Another primary object of the present invention is to provide a honeycomb structural body which can further increase the electrically conductive properties and a method for manufacturing the same.

Through intensive research carried out to achieve the above primary objects, the present inventors found that when a predetermined component is solid-dissolved in a Fe-containing oxide, two members can be more easily and more reliably joined to each other, and the electrically conductive properties can be further improved, and as a result, the present invention was made.

The present invention provides a joined body comprising:
 a first member;
 a second member; and
 a joint portion which is formed of an oxide ceramic containing a $Fe_3O_4$ phase in which a solute component capable of forming a spinel-type oxide with Fe is solid-dissolved and which joins the first member and the second member.

The present invention also provides a method for manufacturing a joined body in which a first member and a second member is joined to each other, the method comprising:
 a step of forming a laminate in which between the first member and the second member, a joint layer including a Fe metal powder and a solute component powder which contains a solute component capable of forming a spinel-type oxide with Fe; and a joining step of firing the laminate in a temperature range lower than the melting point of a Fe oxide to form an oxide ceramic functioning as a joint portion which joins the first member and the second member.

The present invention provides a honeycomb structural body comprising: a partition wall formed of a porous ceramic which forms and defines a plurality of cells each functioning as a flow path of a fluid and extending from one end surface to the other end surface; and an outer circumference wall formed along the outermost circumference, wherein an oxide ceramic containing a $Fe_3O_4$ phase in which a solute component capable of forming a spinel-type oxide with Fe is solid-dissolved is formed.

The present invention also provides a honeycomb structural body comprising: a partition wall formed of a porous ceramic which forms and defines a plurality of cells each functioning as a flow path of a fluid and extending from one end surface to the other end surface; and an outer circumference wall formed along the outermost circumference, wherein an electrode formed of an oxide ceramic containing a $Fe_3O_4$ phase in which a solute component capable of forming a spinel-type oxide with Fe is solid-dissolved is formed on an outer surface of the honeycomb structural body so that the ratio of a length L1 of the electrode to a total length L of the honeycomb structural body in the flow path direction is in a range of 0.1 to 1 and the ratio of a length X1 of the electrode to an outer circumference length X of the surface of the honeycomb structural body perpendicular to the flow path is in a range of 0.02 to 0.3.

The present invention further provides a method for manufacturing a honeycomb structural body comprising: a partition wall formed of a porous ceramic which forms and defines a plurality of cells each functioning as a flow path of a fluid and extending from one end surface to the other end surface; and an outer circumference wall formed along the outermost circumference, the method comprising:

a forming step of, by using a raw material powder including a Fe raw material powder which contains at least one of a Fe metal powder and a Fe oxide powder and a solute component powder which contains a solute component capable of forming a spinel-type oxide with Fe, forming an oxide ceramic layer containing a $Fe_3O_4$ phase in which the solute component is solid-dissolved for the honeycomb structural body.

According to the joined body and the method for manufacturing the same of the present invention, the first member and the second member are joined with the oxide ceramic containing a $Fe_3O_4$ phase in which a solute component capable of forming a spinel-type oxide with Fe is solid-dissolved. This oxide ceramic is made more thermally stable by the solute component. Therefore, the two members can be more reliably joined. In the method for manufacturing a joined body, a joint layer including a Fe metal powder and a solute component powder which contains a solute component capable of forming a spinel-type oxide with Fe is formed and fired, and thus the two members can be more easily joined.

According to the honeycomb structural body and the method for manufacturing the same of the present invention, the oxide ceramic containing a $Fe_3O_4$ phase in which a solute component capable of forming a spinel-type oxide with Fe is solid-dissolved is formed. This oxide ceramic is made more thermally stable by the solute component. Therefore, degradation of the electrically conductive properties can be more reliably prevented. In the method for manufacturing a honeycomb structural body, the raw material powder can be sprayed, and thus the $Fe_3O_4$ phase that is stable at high temperature can be easily formed and the oxide ceramic containing the $Fe_3O_4$ phase can be easily formed.

DESCRIPTION OF THE PREFERRED EMBODIMENTS

Figure 1:
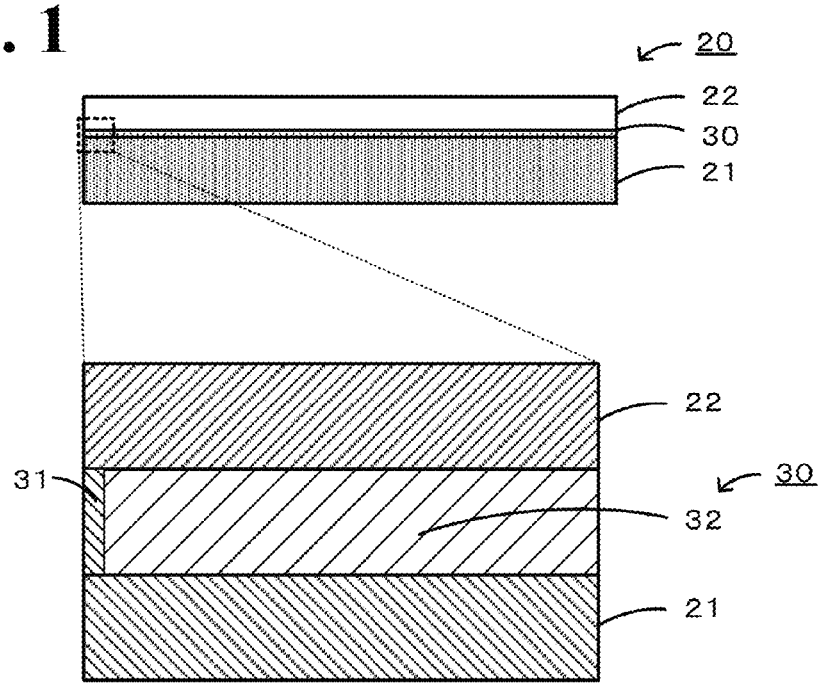
FIG. 1 is an explanatory view showing one example of a schematic structure of a joined body 20.
Figure 2:
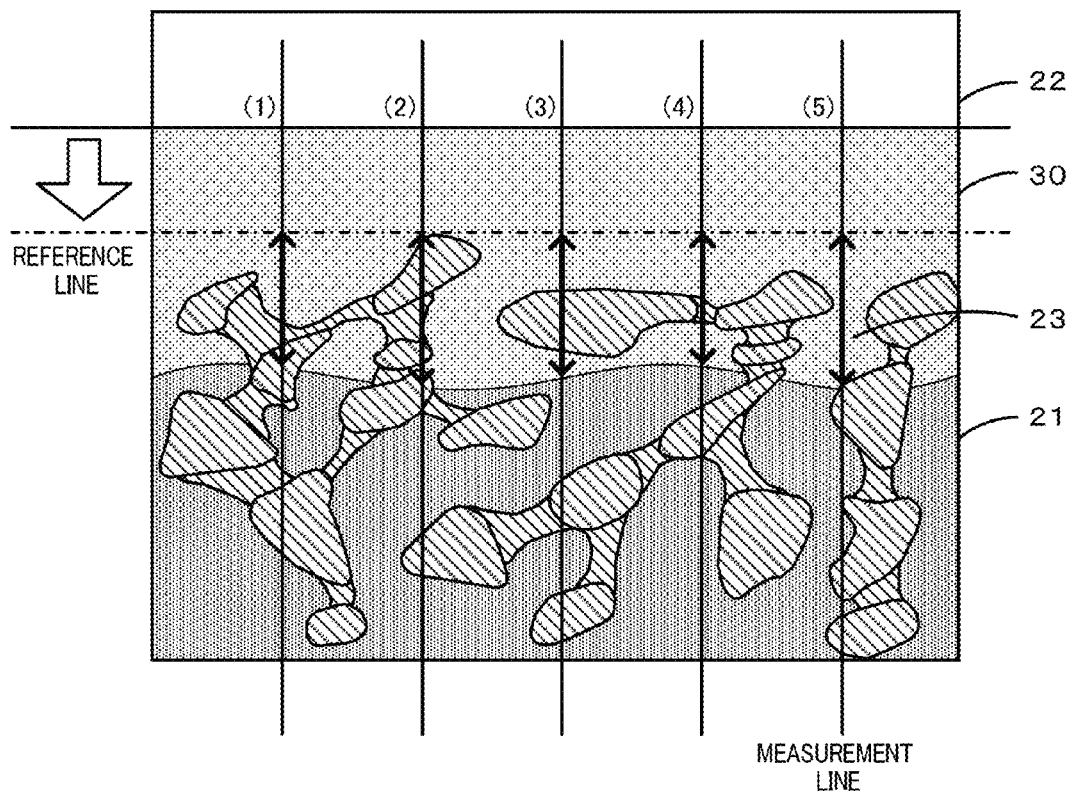
FIG. 2 is an explanatory view of an intrusion depth of an oxide ceramic into a porous ceramic.
Figure 3:
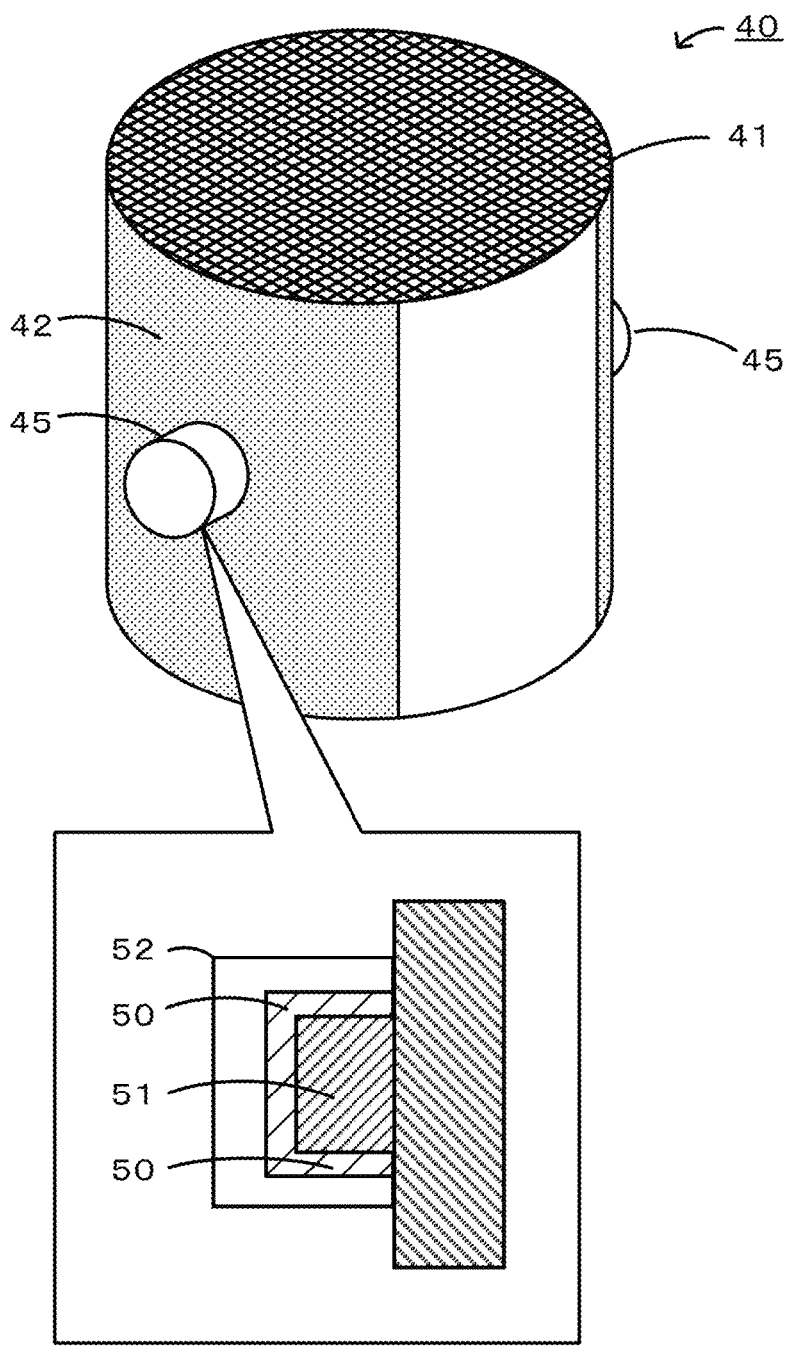
FIG. 3 is an explanatory view of a honeycomb structural body 40 which is one example of the joined body 20.
Figure 4:
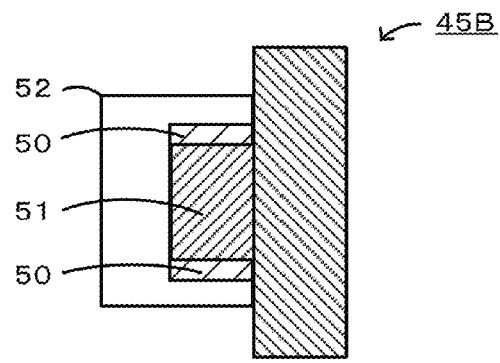
FIG. 4 is an explanatory view of an electrode portion 45B.

Next, embodiments of the present invention will be described with reference to the drawings. FIG. 1 is an explanatory view showing one example of a schematic structure of a joined body 20 according to one embodiment of the present invention. FIG. 2 is an explanatory view of an intrusion depth of an oxide ceramic into a porous ceramic. FIG. 3 is an explanatory view of a honeycomb structural body 40 which is one example of the joined body 20. FIG. 4 is an explanatory view of an electrode portion 45B.

The joined body 20 includes a first member 21, a second member 22, and a joint portion 30 which is formed of an oxide ceramic (hereinafter simply referred to as an oxide ceramic in some cases) containing a $Fe_3O_4$ phase in which a solute component capable of forming a spinel-type oxide with Fe is solid-dissolved and which joins the first member 21 and the second member 22.

The first member 21 and the second member 22, each of which is an object to be joined, may be either a porous ceramic or a dense material. The first member 21 and the second member 22 each may be either a member having electrically conductive properties or a member having no electrically conductive properties. Since a $Fe_3O_4$ phase has relatively high electrically conductive properties among metal oxides, it is preferable that the first member 21 and the second member 22 each have electrically conductive properties and that the joined body 20 has electrically conductive properties. Incidentally, the term "having electrically conductive properties" indicates the case in which the electrical conductivity is $10^{-6}$ S/cm or more, and the term "having no electrically conductive properties" indicates the case in which the electrical conductivity is less than $10^{-6}$ S/cm.

The porous ceramic is not particularly limited as long as having a porous property. As a ceramic having a porous property, any ceramic may be used as long as having open pores in its surface. For example, although a ceramic having a porosity of 10 percent by volume or more may be used, the porosity is preferably 20 percent by volume or more and more preferably 40 percent by volume or more. In view of easy formation, the porosity is preferably 90 percent by volume or less. The porosity of the porous ceramic may be appropriately selected in accordance with the application. The average pore diameter of this porous ceramic is preferably, for example, in a range of 1 to 300 μm. When the average pore diameter is in the range described above, an oxide ceramic is likely to intrude into pores of the porous ceramic and may be more tightly joined thereto. This average pore diameter is more preferably 5 μm or more and further preferably 10 μm or more. This average pore diameter is more preferably 100 μm or less and further preferably 50 μm or less. The porosity and the average pore diameter of the porous ceramic described above each indicate the measurement result obtained by a mercury intrusion method.

The porous ceramic may be formed so as to contain at least one inorganic material selected, for example, from a carbide, such as silicon carbide, titanium carbide, zirconium carbide, or a boron carbide; a nitride, such as silicon nitride, aluminum nitride, titanium nitride, or zirconium nitride; an oxynitride such as sialon; a silicide such as molybdenum silicide; and zirconium phosphate. The porous ceramic may be formed so as to contain at least one inorganic material selected, for example, from cordierite, mullite, zeolite, aluminum titanate, aluminum oxide, zirconium oxide, titanium oxide, silicon oxide, and magnesium oxide. The shape of the porous ceramic is not particularly limited and may be selected in accordance with the application, and may be, for example, a plate shape, a cylindrical shape, and a honeycomb shape, and the structure through which a fluid is allowed to pass. In particular, this porous ceramic may be a honeycomb structural body having a partition wall portion which forms a plurality of cells each functioning as a flow path of a fluid.

The joint portion 30 may be an oxide ceramic which intrudes into pores 23 of the porous ceramic and which joins this porous ceramic to another member. A depth (intrusion depth) of intrusion of this oxide ceramic into the pores of the porous ceramic is preferably 10 μm or more. The reason for this is that the joining strength can be further increased. This intrusion depth is more preferably 15 μm or more and further preferably 20 μm or more. This intrusion depth is preferably in a range of 50 μm or less. A measurement method of this intrusion depth will be described. As shown in FIG. 2, a cross-section in which the first member 21 of the porous ceramic, the second member 22, and the joint portion 30 (oxide ceramic) can be simultaneously observed is mirror-polished. This polished surface is observed using a scanning electron microscope (SEM) at a magnification of 200 times, and a microstructure picture is taken thereby. Next, in the image thus taken, a line in parallel to the line at the bottom end of the second member 22 is drawn so as to be in contact with the topmost portion of the porous ceramic. This line thus drawn is regarded as a reference line (a chain line in FIG. 2), and the intrusion depth at this line is set to 0. Next, the reference line is equally divided into six segments, and five linear lines orthogonal to the reference line are drawn and are used as measurement lines (lines (1) to (5) in FIG. 2). The intersection between the reference line and each measurement line is regarded as a starting point, the intersection between the measurement line and the bottom end of the oxide ceramic is regarded as an end point, and the length therebetween is measured for each of the five measurement lines. The length of each of the five lines in consideration of the magnification used in the picture taking is obtained, and the average value calculated therefrom is regarded as the intrusion depth.

Any dense member having a low porosity may be used as the dense material, and for example, either a metal member or a dense ceramic may be used. The dense material may be a material having a porosity of 5 percent by volume or less, and the porosity is preferably 1 percent by volume or less and more preferably 0.5 percent by volume or less. Although the metal member is not particularly limited as long as being formed of a metal, such as a typical metal or a transition metal, for example, a metal member having high electrically conductive properties is preferable. As the transition metal, a metal, such as Fe, Co, Ni, or Cu, and an alloy thereof are preferable. In accordance with the application, a noble metal, such as Pt or Au, may also be used. This metal member may be used as an electrode, and in this case, for example, stainless steel, such as a Cr—Ni—Fe-based alloy (SUS304) or a Cr—Fe-based alloy (SUS430), is preferably used. This metal member is preferably an alloy containing at least Fe and Cr, and an alloy at least containing 70 to less than 90 percent by mass of Fe and 10 to less than 30 percent by mass of Cr is more preferable. The reasons for this are that the material quality is stable, and the electrically conductive properties are excellent. The shape of the metal member may be appropriately selected from a plate or the like in accordance with the application. As the dense ceramic, for example, a ceramic obtained by densely sintering any one of the materials mentioned above as the porous ceramic, a member formed by filling a filler or an impregnant in the pores of the porous ceramic, or a composite oxide member containing at least two types of metals may be mentioned. As the member formed by filling, in particular, for example, a Si-impregnated SiC sintered body in which pores of porous SiC are impregnated with metal Si may be mentioned. This material has good thermally conductive properties and also has good electrically conductive properties due to the presence of the metal Si. As the composite oxide member, for example, an electrically conductive ceramic material, such as a $LaCrO_3$-based material, a $BaTiO_3$-based material, a $LaMnO_3$-based material, a $LaCoO_3$-based material, a $NaCo_2O_4$-based material, a $CaCo_4O_9$-based material, a $LaNiO_3$-based material, or a $SrTiO_2$-based material, may be mentioned. The expression "-based materials" is intended to include a material partially replaced with an element, e.g., an alkali metal element, an alkaline-earth metal element, or an element having a different valence number. A specific example of the $LaMnO_3$-based materials is $(La_{0.9}Sr_{0.1})MnO_3$.

The first member 21 may be a member formed of an oxide ceramic. That is, as is the joint portion 30 which will be described later, the first member may be formed of an oxide ceramic containing a $Fe_3O_4$ phase in which a solute component capable of forming a spinel-type oxide with Fe is solid-dissolved. The first member 21 may be an electrode formed on an outer surface of a honeycomb structural body including: a partition wall formed of a porous ceramic which forms and defines a plurality of cells each functioning as a flow path of a fluid and extending from one end surface to the other end surface; and an outer circumference wall formed along the outermost circumference. The first member 21 may be formed of the same oxide ceramic as that of the joint portion 30 and may also function as the joint portion 30.

This first member 21 may be formed by thermal spraying. That is, the first member 21 may be manufactured by a thermal spraying step in which after a raw material powder including a Fe raw material powder which contains at least one of a Fe metal powder and a Fe oxide powder and a solute component powder which contains a solute component capable of forming a spinel-type oxide with Fe is melted, the molten raw material powder thus obtained is sprayed on a predetermined substrate so as to form a first member 21 formed from an oxide ceramic containing a $Fe_3O_4$ phase in which a solute component is solid-dissolved. As the raw material powder used in the thermal spraying, for example, a powder obtained by mixing a $Fe_2O_3$ powder and a solute component powder and then granulating a mixture formed thereby may be used, or a powder formed from the powder described above by adding $Fe_3O_4$ thereto or by replacing $Fe_2O_3$ with $Fe_3O_4$ may also be used. When the Fe oxide powder is used, the first member 21 may be formed from an oxide ceramic containing a $Fe_3O_4$ phase in which a solute component is solid-dissolved. When a $Fe_2O_3$ powder is used, a $Fe_3O_4$ phase is generated in a thermal spraying process. In this raw material powder, a Fe metal powder may also be contained. As the thermal spraying method, thermal spraying using a flammable gas, such as flame spraying or high-speed flame spraying; thermal spraying using electric energy, such as arc spraying, (DC) plasma spraying, RF plasma spraying, wire explosion spraying, or electrothermally exploded powder spraying; or thermal spraying using laser light, such as laser spraying or laser/plasma spraying, may be mentioned, and among those techniques, plasma spraying is preferable. As the plasma spraying, for example, air plasma spraying, low pressure plasma spraying, high pressure plasma spraying, under water plasma spraying, or water stabilized plasma spraying may be mentioned, and the air plasma spraying is simple and preferable.

Alternatively, the first member 21 may be a member formed by firing after a raw material powder is formed. That is, the first member 21 may be manufactured by a printing and firing step of forming a first member 21 composed of an oxide ceramic containing a $Fe_3O_4$ phase in which a solute component is solid-dissolved. In the step described above, after a raw material powder including a Fe raw material powder which contains at least one of a Fe metal powder and a Fe oxide powder and a solute component powder which contains a solute component capable of forming a spinel-type oxide with Fe is formed on a predetermined substrate, firing is performed.

The difference in thermal expansion coefficient between the first member 21 and the second member 22 may be set to 4.0 ppm/K or more. Even in a joined body formed by joining two members having a relatively large difference in thermal expansion coefficient, by a joint portion formed of an oxide ceramic, the joining strength and the electrically conductive properties can be maintained. In particular, even in a joined body which is to be repeatedly heated while being used, the joining strength and the electrically conductive properties can be maintained. The difference in thermal expansion coefficient may be set to 6.0 ppm/K or more and may also be set to 15 ppm/K or less. For example, as for the thermal expansion coefficient, a Cr—Ni—Fe-based alloy (SUS304) has 18 ppm/K, a Cr—Fe-based alloy (SUS430) has 12 ppm/K, a Si-bonded SiC sintered body has 4.6 ppm/K, a $Al_2O_3$ porous body has 7.0 ppm/K, and $LaCrO_3$ has 9.4 ppm/K.

The oxide ceramic forming the joint portion 30 may be a Fe oxide in which at least one of Mn, Co, Ni, Cu, and Zn is solid-dissolved as a solute component. Those components are each preferable since capable of forming a spinel-type oxide with Fe and likely to be solid-dissolved in $Fe_3O_4$. Among those components, Ni is preferable as the solute component.

In the oxide ceramic, the solute component is preferably solid-dissolved in a range of 0.5 to 30 percent by mass, more preferably in a range of 1 to 25 percent by mass, and further preferably in a range of 1 to 15 percent by mass. These ranges are preferable because a high joining strength is obtained and the heat resistance is also high.

The oxide ceramic may contain Ni as a solute component, and the peak shift of the (751) plane of $Fe_3O_4$ measured by x-ray diffraction using the CuKα line may be set to 0.02° or more. Accordingly, the oxide ceramic can be made more thermally stable. This peak shift is more preferably 0.05° or more and may also be set to 0.1° or more. In addition, this peak shift may be 0.45° or less, and is preferably 0.21° or less. With the peak shift of 0.45° or less, the amount of oxide added can be reduced, and decrease of strength can be prevented.

The oxide ceramic may further contain a $Fe_2O_3$ phase besides a $Fe_3O_4$ phase and may contain Ni as a solute component, and the peak shift of the (410) plane of $Fe_2O_3$ measured by x-ray diffraction using the CuKα line may be set to 0.02° or more. Accordingly, the oxide ceramic can be made further thermally stable. This peak shift is more preferably 0.04° or more and may also be set to 0.05° or more. In addition, this peak shift may be 0.055° or less. With the peak shift of 0.055° or less, the amount of oxide added can be reduced, and decrease of strength can be prevented.

The oxide ceramic may contain no crystal phase of $Fe_2MO_4$ (where M represents a solute component). Since this $Fe_2MO_4$ has low electrically conductive properties, when a joined body having electrically conductive properties is to be formed, the presence of this crystal phase is not preferable.

In the joint portion 30, a surface layer 31 may be formed of a $Fe_2O_3$ phase, and an inner portion 32 may be formed of a $Fe_3O_4$ phase. Accordingly, since a chemically and thermally stable $Fe_2O_3$ phase is present at the surface of the joint portion, the thermal stability of the $Fe_3O_4$ phase is likely to be maintained. The surface layer 31 may be a dense layer as compared to the inner portion 32. This surface layer 31 may have a porosity of 5 percent by volume or less. This surface layer 31 is preferably formed only on a surface to be exposed to the air. This surface layer 31 may also be formed of a crystal phase other than the $Fe_2O_3$ phase and may be formed not on the surface to be exposed to the air. In the joint portion 30, the thickness of the surface layer 31 is preferably 15 μm or less. The thickness of the surface layer 31 may be set to either 10 μm or less or 8 μm or less. In view of thermal and chemical protection of the inner portion 32, the thickness of the surface layer 31 may be appropriately selected.

The oxide ceramic may contain Fe as a first component which is a primary component of a metal and at least one of Si, Zr, Ti, Sn, Nb, Sb, and Ta as a second component. This second component is a component different from the component solid-dissolved in the $Fe_3O_4$ phase described above and may be an auxiliary component to the solute component. When the joint portion contains the second component, the electrically conductive properties are further imparted thereto since the second component is further solid-dissolved in $Fe_3O_4$ of the oxide ceramic; hence, for example, the degradation in electrically conductive properties caused by use under heating conditions can be preferably suppressed. It is preferable that the joint portion contains the second component, because the electrical resistance of the joint portion can be further reduced, and heat generation is not likely to occur. The joint portion 30 may be formed, for example, by adding a compound (also called a second compound) containing the second component to a raw material containing the first component. This second compound may also be used as an electrically conductive auxiliary agent. This second compound may be a carbonate salt, an oxide, a hydroxide, a chloride, and/or a nitrate salt, and among those mentioned above, this second compound may be a carbonate salt or an oxide. In particular, as the second compound, for example, $TiO_2$, $SnO_2$, $Nb_2O_5$, $SiO_2$, or $ZrO_2$ may be mentioned. The content of the second component is, for example, preferably 5 percent by mass or less on the compounding standard of the joint portion and more preferably 2 percent by mass or less.

In the oxide ceramic, an oxide of the solute component may co-exist. For example, when the primary component of the oxide ceramic is a $(Fe,Ni)_3O_4$ phase, NiO, which is an oxide of the solute component, may also be present as a crystal phase, and when the primary component of the oxide ceramic is a $(Fe,Mn)_3O_4$ phase, an oxide, such as MnO, $MnO_2$, $Mn_2O_3$, and/or $Mn_3O_4$, may also co-exist. In the oxide ceramic, a Fe metal may also remain.

In the joined body in which the first member 21 and the second member 22, each of which has electrically conductive properties, are joined to each other, the electrical conductivity of the joint portion 30 is preferably $1 \times 10^{-1}$ (S/cm) or more. The electrical conductivity of the joint portion 30 is more preferably 1 (S/cm) or more and further preferably 10 (S/cm) or more. As the electrical conductivity is higher, the electrically conductive properties are improved, and the electricity can be efficiently used; however, in consideration of materials to be used in combination, the upper limit may be approximately $10^3$ (S/cm). The electrical conductivity may be determined by forming holes in parts of the protective layer 14, baking Ag electrodes on exposed portions, bringing probes into contact with the electrodes to measure the electrical resistance, converting the resulting resistance into volume resistivity using the area of the electrodes and the interelectrode distance, and calculating the reciprocal of the volume resistivity.

In the joined body of the present invention, the joining strength between the first member and the second member is preferably 3.5 MPa or more. The joining strength is measured by a four-point bending test (JIS-R1632). This joining strength is more preferably 5.0 MPa or more and further preferably 10 MPa or more. As the joining strength is increased, a stronger joining is obtained, and the reliability is preferably enhanced; however, in consideration of materials to be used in combination, the upper limit may be approximately 500 MPa.

The joint portion 30 may be formed by adding a pore forming agent. The pore forming agent preferably disappears when processed by some type of treatment, and for example, at least one type selected from the group consisting of carbon black, coke, starch, glutinous rice flour, natural resin, and synthetic resin, which are burnt down by a heat treatment, may be used. For example, the amount of the pore forming agent of the joint portion is on the volume rate basis, preferably 10 percent by volume or more and more preferably 20 percent by volume or more. It is preferable that 10 percent by volume or more of the pore forming agent is used, because the stress relaxation in the joint portion is further improved. The amount of the pore forming agent of the joint portion is on the volume rate basis, preferably 50 percent by volume or less and more preferably 30 percent by volume of less. It is preferable that 50 percent by volume or less of the pore forming agent is used, because the decrease in mechanical strength of the joint portion can be further suppressed. The amount of the pore forming agent of the joint portion is preferably appropriately selected in accordance with the relationship between the degree of stress relaxation and the mechanical strength of the joint portion.

The joint portion 30 may be manufactured by a joining step as described below. After a laminate is formed by forming between the first member 21 and the second member 22, a joint layer including a Fe metal powder and a solute component powder which contains a solute component capable forming a spinel-type oxide with Fe, this laminate is fired in a low temperature range compared to the melting point of a Fe oxide to form an oxide ceramic, so that the joint portion 30 is formed. In this joining step, the joint portion 30 may be formed by firing in the air or by firing in the air after a heat treatment is performed in a non-oxidizing atmosphere.

Alternatively, the joint portion 30 may be manufactured by a thermal spraying step in which a raw material powder including a Fe raw material powder which contains at least one of a Fe metal powder and a Fe oxide powder and a solute component powder which contains a solute component capable of forming a spinel-type oxide with Fe is melted and then sprayed to form the joint portion 30 from a ceramic which joins the first member 21 and the second member 22 adjacent thereto. As the raw material powder for thermal spraying, a powder obtained by mixing a $Fe_2O_3$ powder and a solute component powder and then granulating a mixture formed thereby may be used, or a powder formed from the powder described above by adding $Fe_3O_4$ a thereto or by replacing $Fe_2O_3$ with $Fe_3O_4$ may be used. When a Fe oxide powder is used, the joint portion 30 can be formed from an oxide ceramic containing a $Fe_3O_4$ phase in which a solute component is solid-dissolved. The details of the thermal spraying are similar to those described above, and hence, the description thereof will be omitted.

The joined body 20 is not particularly limited as long as having the structure in which the first member 21 and the second member 22 are joined to each other, and for example, the joined body may be used, for example, for a honeycomb structural body, a thermoelectric element, a ceramic heater, or a gas sensor for oxygen, $NO_x$, or the like. For example, in the case of the honeycomb structural body, the joined body may be preferably used as a device or the like which heats the honeycomb structural body by applying the voltage to metal members. The first member may be a part of a honeycomb structural body including: a partition wall formed of a porous ceramic which forms and defines a plurality of cells each functioning as a flow path of a fluid and extending from one end surface to the other end surface; and an outer circumference wall formed along the outermost circumference. The second member 22 may be a metal member. As shown in FIG. 3, a honeycomb structural body 40 is configured to heat a honeycomb substrate 41 by applying the voltage between electrode portions 45. This honeycomb structural body 40 includes the honeycomb substrate 41, a high electrically conductive portion 42 having high electrically conductive properties as compared to those of the honeycomb substrate 41, and the electrode portions 45 connected to the high electrically conductive portion 42. The electrode portion 45 includes an electrode terminal protrusion portion 51 connected to the high electrically conductive portion 42, a metal terminal portion 52 which is a metal member, and a joint portion 50 electrically and mechanically connecting the electrode terminal protrusion portion 51 and the metal terminal portion 52. This joint portion 50 is formed of an oxide ceramic as is the joint portion 30. That is, the first member 21 is the electrode terminal protrusion portion 51 which is formed to have a convex shape or a concave shape, the second member 22 is the metal terminal portion 52 which is formed so that a portion to be joined to the electrode terminal protrusion portion 51 has a concave shape or a convex shape complementary to the shape of the electrode terminal portion, and the joint portion 50 electrically connects the electrode terminal protrusion portion 51 and the metal terminal portion 52 at a portion between the concave shape and the convex shape at which the electrode terminal protrusion portion 51 and the metal terminal portion 52 are engaged with each other. In this case, as shown by an electrode portion 455 of FIG. 4, the electrode terminal protrusion portion 51 and the metal terminal portion 52 may form no space between a protruding front end of the convex shape and a bottom part of the concave shape, those shapes being complementary to each other, and the joint portion 50 may electrically connect the electrode terminal protrusion portion 51 and the metal terminal portion 52 at side surface portions of the concave shape and the convex shape at which the electrode terminal protrusion portion 51 and the metal terminal portion 52 are engaged with each other. For example, when the honeycomb structural body is formed of a Si-bonded SiC ceramic, the high electrically conductive portion 42 may have a higher metal Si content.

Figure 5:
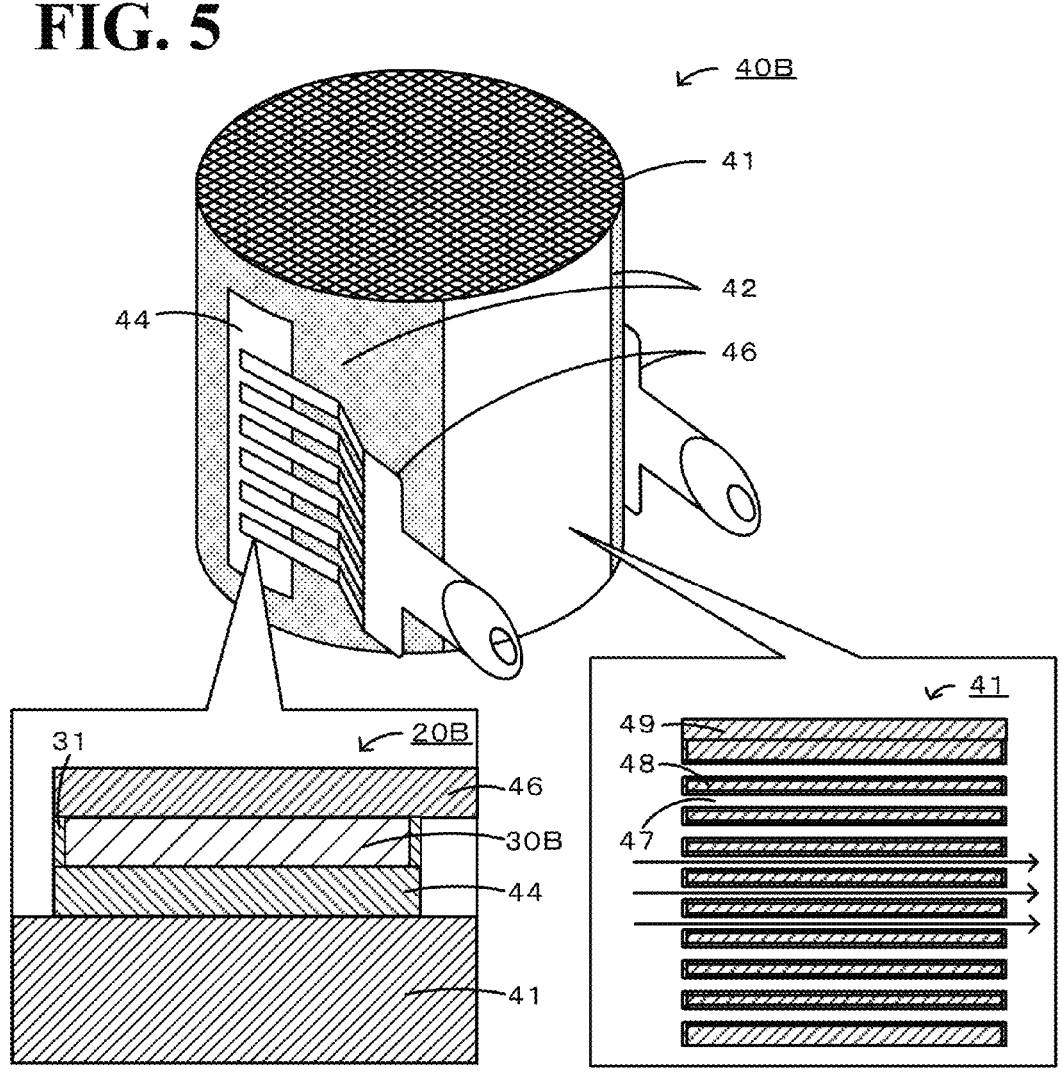
FIG. 5 is an explanatory view of a honeycomb structural body 40B.

Next, a honeycomb structural body of the present invention will be described in detail. FIG. 5 is an explanatory view of a honeycomb structural body 40B. This honeycomb structural body 40B includes: a partition wall 48 formed of a porous ceramic which forms and defines a plurality of cells 47 each functioning as a flow path of a fluid and extending from one end surface to the other end surface; and an outer circumference wall 49 formed along the outermost circumference. For this honeycomb structural body 40B, an oxide ceramic containing a $Fe_3O_4$ phase in which a solute component capable of forming a spinel-type oxide with Fe is solid-dissolved is formed. This oxide ceramic may be used as electrodes 44 each formed on an outer surface of the honeycomb structural body 40B. When the electrode 44 is formed of this oxide ceramic, the heat resistance and the oxidation resistance can be further improved, and the decrease in electrically conductive properties can be further suppressed. The honeycomb structural body 40B is provided with the electrodes 44, each of which functions as the first member, formed on the outer surface (surface of the outer circumference wall 49) of the honeycomb structural body 40B and terminals 46, each of which functions as the second member, and the oxide ceramic may be used as the joint portion 30 which joins the first member and the second member. When this oxide ceramic is used as the joint portion 30, the heat resistance and the oxidation resistance can be further improved, more reliable joining can be obtained, and the decrease in electrically conductive properties can be further suppressed. Furthermore, the electrode 44 and the joint portion 30 each may be formed from this oxide ceramic. This oxide ceramic may be formed for the honeycomb structural body 40B by thermal spraying. Accordingly, the oxide ceramic containing a $Fe_3O_4$ phase in which a solute component is solid-dissolved can be more easily formed. Alternatively, the oxide ceramic may be obtained by firing after the raw material powder is formed on the honeycomb structural body (or the electrode 44). In this honeycomb structural body 40B, the difference in thermal expansion coefficient between the first member and the second member may be set to 4.0 ppm/K or more. When the joint portion 30 is formed from this oxide ceramic, even if the difference in thermal expansion coefficient is large as described above, more reliable joining can be obtained.

Figure 6A:
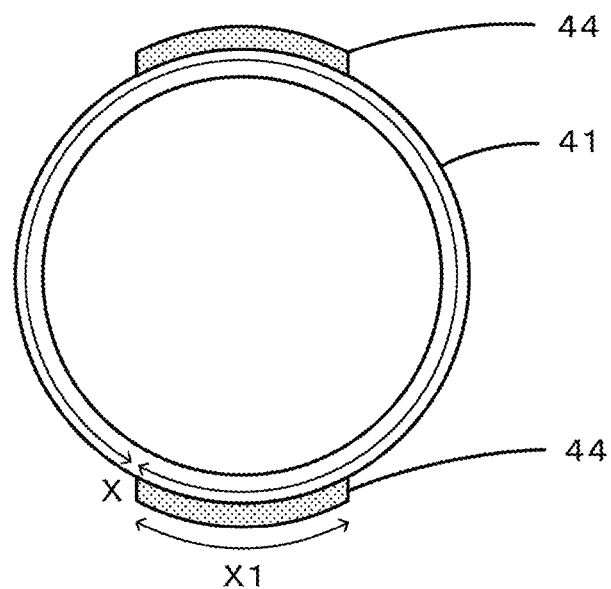
FIGS. 6A-6B show explanatory views of a total length L, a length L1, an outer circumference length X, and a length X1 of the honeycomb structural body.
Figure 6B:
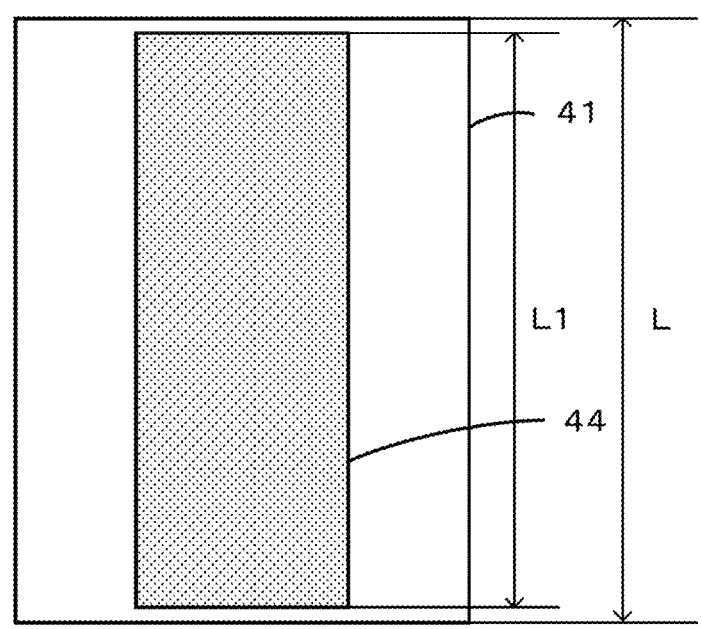

In the honeycomb structural body of the present invention, the oxide ceramic may be the electrode 44 formed on the outer surface of the honeycomb structural body so that a ratio (L1/L) of a length L1 of the oxide ceramic to a total length L of the honeycomb structural body in a flow path direction is in a range of 0.1 to 1, and a ratio (X1/X) of a length X1 of the oxide ceramic to an outer circumference length X of the surface of the honeycomb structural body perpendicular to the flow path is in a range of 0.02 to 0.3. FIG. 6 includes explanatory views of the total length L of the honeycomb structural body, the length L1, the outer circumference length X, and the length X1; FIG. 6A is a top plan view; and FIG. 6B is a side view. When L1/L is 0.1 or more, the heat generation distribution can be made more uniform. When X1/X is 0.02 or more, the heat generation distribution can be made more uniform. When X1/X is 0.3 or less, the decrease in heat shock resistance can be further suppressed. When the electrode 44 formed from this oxide ceramic is in the range described above, by voltage application, electricity can be more uniformly supplied to the honeycomb substrate 41. The length L1 in the flow path direction may be set in a range of 10 to 90 mm. The outer circumference length X1 of the surface of the electrode 44 perpendicular to the flow path is preferably set to ¼ or less of the honeycomb outer circumference length X and is preferably set in a range of 5 to 70 mm. A thickness t of the electrode 44 is preferably in a range of 10 to 500 μm. When the thickness t is 10 μm or more, since the apparent resistance is decreased, the heat generation distribution can be made more uniform. When the thickness t is 500 μm or less, the difference in thermal expansion coefficient between the substrate and the electrode can be further reduced, and the decrease in heat shock resistance can be further suppressed. This electrode 44 may be formed so that a ratio (S1/S) of an area S1 of the electrode to a total area S of the outer side surface of the honeycomb structural body is 0.002 to 0.3. When the electrode 44 is formed in the range described above, by voltage application, electricity can be more uniformly supplied to the honeycomb substrate 41. Since the solute component, the peak shift, and the like are similar to those of the joined body described above, the description thereof will be omitted.

Figure 7:
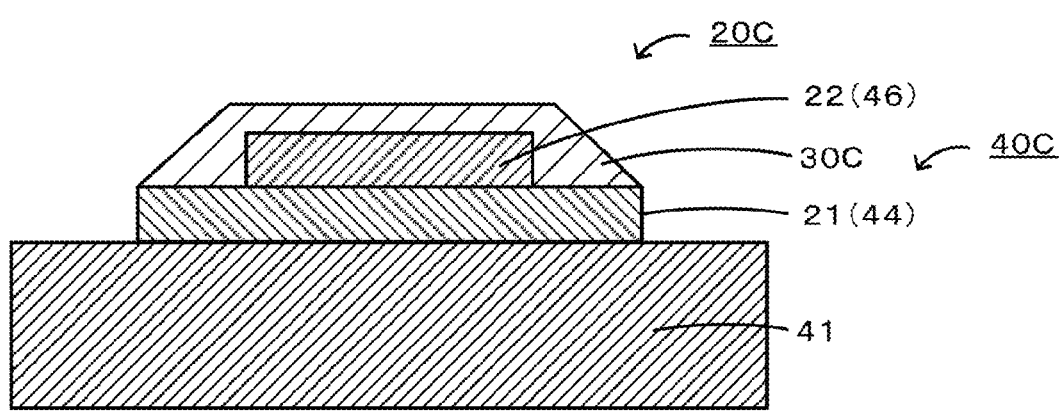
FIG. 7 is an explanatory view of a honeycomb structural body 40C which is one example of a joined body 20C.

According to the honeycomb structural body of the present invention, as shown in FIG. 7, there may be provided the electrode 44, which is the first member 21, formed on an outer surface of a honeycomb structural body 40C, the terminal 46, which is the second member 22, adjacent to the electrode 44, and a joint portion 30C which is formed of an oxide ceramic and which joins the electrode 44 and the terminal 46 by covering thereof. That is, a joined body 20C of the present invention may include the first member 21, the second member 22 adjacent thereto, and the joint portion 30C joining the first member 21 and the second member 22 by covering thereof. According to the structure described above, the two members can also be joined to each other with high reliability. The decrease in electrically conductive properties can be further suppressed. In this joined body 20C, the joint portion 30C may be formed in such a way that a raw material powder of the joint portion 30C is melted and then sprayed to the electrode 44, which is the first member 21, formed on the outer surface of the honeycomb structural body 40C and the terminal 46, which is the second member 22, adjacent to the electrode 44 so as to join the electrode 44 and the terminal 46 by covering thereof.

The honeycomb structural body of the present invention may be a honeycomb filter in which the cells are formed so that the end portions thereof are not sealed or so that the end portions thereof are alternately sealed. The honeycomb structural body may be integrally formed or may be formed in such a way that after rectangular parallelepiped honeycomb segments are joined to each other, the outer diameter thereof is machined to have a cylindrical shape.

Next, a method for manufacturing a joined body of the present invention will be described. The method for manufacturing a joined body of the present invention may include, for example, a joining step of forming a laminate in which a joint layer including a Fe metal powder and a solute component powder which contains a solute component capable of forming a spinel-type oxide with Fe is formed between a first member and a second member, and a firing this laminate in a temperature range lower than the melting point of a Fe oxide to form an oxide ceramic functioning as a joint portion which joins the first member and the second member.

(Joining Step)

As a material used for the joint portion, a Fe metal powder and a solute component powder containing a solute component capable of forming a spinel-type oxide with Fe may be mentioned. As the solute component, at least one of Mn, Co, Ni, Cu, and Zn may be mentioned. The solute component may be, for example, a metal powder or an oxide powder containing a solute component. Ss for Fe, since a Fe oxide is not able to form a sufficient joint between the first member and the second member even by a heat treatment, the Fe oxide is not suitable for the raw material of the joint portion. As this raw material powder, a powder having an average particle diameter of 1 to 40 μm is preferably used. In the range described above, an appropriate joining strength is likely to be obtained. The average particle diameter of the raw material of this joint portion is preferably 30 μm or less, more preferably 10 μm or less, and further preferably 5 μm or less. This average particle diameter is more preferably 3 μm or more. The average particle diameter of this raw material powder indicates the median diameter (D50) measured by a laser diffraction/scattering particle size distribution measurement apparatus using water as a dispersion medium.

In this step, at least two raw material powders having different particle sizes are preferably mixed together to form a raw material powder of the joint portion. Accordingly, the joining strength at the joint portion can be further increased. The Fe metal powder may be prepared by mixing a first powder having a predetermined average particle diameter (μm) and a second powder having an average particle diameter (μm) larger than the predetermined average particle diameter. The second powder is preferably used in order to improve the strength of the joint portion itself. The average particle diameter of the first powder may be set in a range of 0.1 to 10 (μm), and the average particle diameter of the second powder may be set in a range of 10 to 100 (μm). The addition amount of the solute component is, for example, as the composition rate to the total of the joint portion, preferably 0.5 percent by mass or more, more preferably 1 percent by mass or more, and further preferably 2 percent by mass or more. This addition amount of the solute component as the composition rate to the total of the joint portion is preferably 30 percent by mass or less, more preferably 25 percent by mass or less, and further preferably 15 percent by mass or less.

In the joining step, the laminate may be fired in the air or may be fired in the air after a heat treatment is performed in a non-oxidizing atmosphere. As the non-oxidizing atmosphere, for example, a nitrogen atmosphere or a rare gas atmosphere (Ar or He) may be mentioned. Any joining temperature (firing temperature) may be selected as long as being in a lower temperature range than the melting point of a Fe oxide, and a temperature of 400° C. to 900° C. is preferable. In this temperature range, the joint layer can be oxidized into an oxide ceramic. Although this joining temperature is set in an appropriate range in accordance with the material of the joint portion, the joining temperature is more preferably 500° C. or more and further preferably 600° C. or more. The joining temperature is more preferably 850° C. or less and further preferably 800° C. or less. This joining temperature is preferably higher in view of sufficient oxidation and is preferably lower in view of energy consumption. As described above, a joining treatment can be performed in a simple atmosphere, such as in the air, and at a low temperature, such as 900° C. or less. In this step, the firing is preferably performed so that the porosity of the oxide ceramic is 60 percent by volume or less, and the porosity is more preferably 50 percent by volume or less and further preferably 30 percent by volume or less. The oxide ceramic is more preferably a dense body in view of the joining strength. In this step, the firing is preferably performed so that the porosity of the oxide ceramic is 5 percent by volume or more, more preferably performed so that the porosity is 10 percent by volume or more, and further preferably performed so that the porosity is 20 percent by volume or more. The oxide ceramic more preferably has pores in view of stress relaxation.

In the joining step, a surface layer containing a $Fe_2O_3$ phase may be formed in the joint portion. This surface layer may be formed, for example, by the following method. After the raw material powder of the joint portion is formed into a paste, this joining material paste is formed on the first member and/or the second member and is then held in the air at 750° C. for 1 hour for firing, so that a double layer structure including the surface layer and the inner portion can be formed. The thickness of the surface layer can be controlled by a firing temperature and a holding time. When the temperature is increased, the thickness of the surface layer is increased, and when the holding time is increased, the thickness of the surface layer is increased. In particular, when the thickness of the joining material paste is 300 μm, the firing temperature is preferably 1,000° C. or less. When the temperature is 1,000° C. or less, excessive oxidation so as to form no double layer structure can be more suppressed. This firing temperature is preferably 300° C. or more. The reason for this is that when the temperature is 300° C. or more, oxidation is sufficiently performed. In the case in which firing is performed using a common atmosphere furnace, the holding time of the firing is preferably 24 hours or less. When the time is more than 24 hours, since the growth of the surface layer is almost stopped, a shorter holding time than that mentioned above is preferable in consideration of production cost and material amounts. The holding time is preferably 10 minutes or more. The reason for this is that when the time is 10 minutes or more, a sufficient surface layer can be formed. Alternatively, as a method for forming the surface layer, for example, the joining material paste is formed on the first member and/or the second member and is then held in Ar at 750° C. for 1 hour for firing, so that a $Fe_3O_4$ single phase is obtained. Subsequently, the $Fe_3O_4$ single phase thus obtained may be held in the air at 750° C. for 0.5 hours so as to form the surface layer. The thickness of the surface layer can be controlled by a firing temperature and a holding time in the air. The firing temperature in the air is preferably in a range of 300° C. to 1,000° C. as in the case described above.

In this step, besides the first component, which is a metal as a primary component, and the solute component, a compound (second compound) containing a second component which is a metal element is preferably added to the raw material powder of the joint portion. This second compound may be used as an electrically conductive auxiliary agent. As the second compound, for example, $TiO_2$, $SnO_2$, $Nb_2O_5$, $SiO_2$, or $ZrO_2$ may be mentioned.

In this step, a pore forming agent may be added to the raw material powder of the joint portion. For example, the amount of the pore forming agent of the joint portion is on the volume rate basis, preferably 10 percent by volume or more and more preferably 20 percent by volume or more. When 10 percent by volume or more of the pore forming agent is used, it is preferable since the stress relaxation in the joint portion is further improved. The amount of the pore forming agent of the joint portion is on the volume rate basis, preferably 50 percent by volume or less and more preferably 30 percent by volume of less. When 50 percent by volume or less of the pore forming agent is used, it is preferable since the decrease in mechanical strength of the joint portion can be further suppressed. The amount of the pore forming agent of the joint portion may be appropriately selected in accordance with the relationship between the degree of stress relaxation and the mechanical strength of the joint portion.

In the step described above, firing is preferably performed while the movement of the first member 21 and the second member 22 is restricted. Accordingly, the displacement of the members can be prevented. In addition, it is believed that the first member 21 and the second member 22 can be more reliably joined to each other. Incidentally, the term "restriction of movement" may include, for example, the case in which a metal member is fixed by applying a load thereto which may be given by a holding jig or the like. Although it is possible to fix the first member 21 and the second member 22 by positively applying a pressure, the treatment as described above is preferably omitted in view of simplification of the manufacturing step.

Next, a method for manufacturing a honeycomb structural body will be described. This manufacturing method is a method for manufacturing a honeycomb structural body including a partition wall formed of a porous ceramic which forms and defines a plurality of cells each functioning as a flow path of a fluid and extending from one end surface to the other end surface and an outer circumference wall formed along the outermost circumference. This manufacturing method includes a forming step of, by using a raw material powder including a Fe raw material powder which contains at least one of a Fe metal powder and a Fe oxide powder and a solute component powder which contains a solute component capable of forming a spinel-type oxide with Fe is melted, forming an oxide ceramic containing a $Fe_3O_4$ phase in which a solute component is solid-dissolved is formed for the honeycomb structural body. In this forming step, the oxide ceramic layer may be formed on an outer surface of the honeycomb structural body. The forming step may be a thermal spraying step of, after the raw material powder is melted, thermal spraying the raw material powder. Otherwise, the forming step may be a firing step of, after the raw material powder is formed on the honeycomb structural body, firing the ram material powder. The thermal spraying step may be a step of, after the raw material powder is melted, forming a joint portion of an oxide ceramic which joins an electrode, which is the first member, formed on the outer surface of the honeycomb structural body and a terminal, which is the second member, adjacent to the electrode described above.

As the raw material powder used in the forming step, a powder obtained by mixing a $Fe_2O_3$ powder and a solute component powder and then granulating a mixture formed thereby may be used, or a powder formed by adding $Fe_3O_4$ to the powder described above or by replacing $Fe_2O_3$ with $Fe_3O_4$ may be used. When the Fe oxide powder is used, the electrode and the joint portion may be formed from an oxide ceramic containing a $Fe_3O_4$ phase in which a solute component is solid-dissolved. The raw material powder may further contain a Fe metal powder. When the $Fe_2O_3$ powder is used in the thermal spraying step, a $Fe_3O_4$ phase is generated in the thermal spraying process. As the thermal spraying method, for example, thermal spraying using a flammable gas, such as flame spraying or high-speed flame spraying; thermal spraying using electric energy, such as arc spraying, (DC) plasma spraying, RF plasma spraying, wire explosion spraying, or electrothermally exploded powder spraying; or thermal spraying using laser light, such as laser spraying or laser/plasma spraying, may be mentioned, and among those techniques, plasma spraying is preferable. As the plasma spraying, for example, air plasma spraying, low pressure plasma spraying, high pressure plasma spraying, under water plasma spraying, or water stabilized plasma spraying may be mentioned, and the air plasma spraying is simple and preferable. In addition, a raw material powder having a particle size D90 of 150 to 1,000 μm, a particle size D50 of 20 to 150 μm, and a particle size D10 of 10 μm or less is preferably used. When plasma spraying is performed, as the thermal spraying conditions, an Ar gas may be used, or $H_2$ may be added thereto. Plasma spraying may be performed at a current of 600 to 1,000 A and a voltage of 30 to 100 V.

Alternatively, the oxide ceramic layer may be obtained by firing after the raw material powder is formed on a honeycomb substrate. That is, the oxide ceramic layer may be formed by a printing and firing step in which after a raw material powder including a Fe raw material powder which contains at least one of a Fe metal powder and a Fe oxide powder and a solute component powder which contains a solute component capable of forming a spinel-type oxide with Fe is formed on a honeycomb substrate, firing is performed so as to form an oxide ceramic layer containing a $Fe_3O_4$ phase in which a solute component is solid-dissolved. In the printing and firing step, after the raw material powder is formed on the honeycomb substrate, a heat treatment may be performed. Accordingly, the heat resistance can be further improved. This heat treatment may be performed in the air at 700° C. to 950° C. and more preferably at 800° C. to 850° C. In this heat treatment, the temperature described above may be held for 30 minutes to 2 hours and more preferably for 1 hour.

In the forming step (the thermal spraying step and the printing and firing step), when the oxide ceramic layer serves as an electrode, as described above, the electrode may be formed on the outer surface of the honeycomb structural body so that the ratio (L1/L) of the length L1 of the electrode to the total length L of the honeycomb structural body in a flow path direction is in a range of 0.1 to 1 and the ratio (X1/X) of the length X1 of the electrode to the outer circumference length X of the surface of the honeycomb structural body perpendicular to the flow path is in a range of 0.02 to 0.3. In this step, the electrode may be formed so that the ratio (S1/S) of the area S1 of the electrode to the total side surface area S of the outer surface of the honeycombs structural body is in a range of 0.002 to 0.3.

According to the joined body of the embodiment and the method for manufacturing the same described above, the first member and the second member are joined to each other with an oxide ceramic containing a $Fe_3O_4$ phase in which a solute component capable of forming a spinel-type oxide with Fe is solid-dissolved. In this oxide ceramic, $Fe_3O_4$ is thermally stabilized by the solute component. Hence, the two members can be more reliably joined to each other. In the manufacturing method of the joined body, a joint layer including a Fe metal powder and a solute component powder containing a solute component capable of forming a spinel-type oxide with Fe is formed and then fired, so that the two members can be joined to each other by a simple step.

According to the honeycomb structural body of the embodiment and the method for manufacturing the same described above, an oxide ceramic containing a $Fe_3O_4$ phase in which a solute component capable of forming a spinel-type oxide with Fe is solid-dissolved is formed. In this oxide ceramic, $Fe_3O_4$ is thermally stabilized by the solute component. Hence, the decrease in electrically conductive properties can be further suppressed. In this manufacturing method, the raw material powder can be sprayed, and in this case, a $Fe_3O_4$ phase, which is a high-temperature stable phase, is likely to be generated, and an oxide ceramic containing a $Fe_3O_4$ phase can be more easily formed.

The present invention is not limited at all to the embodiments described above and may be performed in various modes without departing from the technical scope of the present invention.

EXAMPLES

Hereinafter, examples in each of which the joined body of the present invention was actually manufactured will be described as experimental examples. Experimental Examples 3 to 8, 11 to 19, and 21 to 23 correspond to examples of the present invention, Experimental Examples 1, 2, 9, 10, and 20 correspond to comparative examples, and Experimental Examples 24 to 45 correspond to reference examples.

Formation Method

A first member and a second member were prepared. A metal powder of Fe, a metal powder of Ni, Mn, Co, Cu, or Zn or an oxide powder thereof, a poly(vinyl butyral) resin (PVB) as a binder, and terpineol as a solvent were mixed together to form a joining material paste. To the joining material paste, a second compound ($TiO_2$) and/or a pore forming agent (starch) was added in accordance with each sample. The Fe metal powder used as a raw material was prepared by mixing a powder (fine powder) having an average particle diameter 3 μm and a powder (coarse powder) having an average particle diameter of 35 μm at an appropriate composition ratio. This joining material paste was applied to the first and the second members, each of which was an object to be joined, and those members were adhered to each other with the paste provided therebetween. A sample obtained by adhesion as described above was left in the air at 80° C. over one night, so that terpineol was sufficiently dried. A holding jig was placed on this sample so as to prevent the displacement of the two members and was fired (joined) in the air at 200° C. to 800° C. As a firing atmosphere, an air atmosphere or a non-oxidizing atmosphere was used. When the heat treatment was performed in a non-oxidizing atmosphere (Ar), firing was then performed in the air at 200° C. to 800° C.

Formation of First Member

As a porous ceramic, a Si-bonded SiC sintered body was formed. As a raw material of the porous ceramic of the Si-bonded SiC sintered body, a "mixed powder" was formed by mixing a SiC powder and a metal Si powder at a volume ratio of 38:22. To the "mixed powder" described above, a hydroxypropyl methylcellulose as a binder, a starch as a pore forming agent, and a water absorptive resin were added together with water, so that a raw material (molding raw material) for forming a porous material was obtained. The molding raw material was kneaded, so that a cylindrical molding precursor was formed. The cylindrical molding precursor thus obtained was molded by extrusion using an extruder, so that a honeycomb molded body was formed. This molded body was dried in an air atmosphere at 120° C. to form a dried body. This dried body was degreased in an air atmosphere at 450° C. and was then fired in an Ar atmosphere at 1,450° C. at a normal pressure for 2 hours. From a honeycomb porous ceramic obtained as described above, a rectangular parallelepiped sample having a size of 10×20×35 mm was obtained by cutting, so that a substrate (porous ceramic) was obtained. This substrate had a porosity of 40 percent by volume measured by a mercury intrusion method using a mercury porosimeter (Autopore IV9520, manufactured by Micromeritics Corp.) and an average pore diameter of 10 μm measured by a method similar to that described above.

As a dense ceramic, a Si-impregnated SiC sintered body in which metal Si was impregnated in a SiC sintered boy and a ceramic material of $LaCrO_3$, which was a composite oxide, were formed. For the Si-impregnated SiC sintered body, a hydroxypropyl methylcellulose as a binder, a starch as a pore forming agent, and a water absorptive resin were added together with water to a SiC powder as a raw material, so that a raw material (molding raw material) for forming a porous material was obtained. The molding raw material was kneaded to obtain a cylindrical molding precursor and was then molded by extrusion using an extruder, so that a bar-shaped molded boy (10×20×35 mm) was formed. After this molded body was dried in an air atmosphere at 120° C. and was then degreased in an air atmosphere at 450° C., firing was performed in an Ar atmosphere at 1,450° C. at a normal pressure for 2 hours. A porous ceramic obtained as described above was impregnated with metal Si, so that a substrate (dense ceramic) was obtained. The impregnation treatment was performed as described below. First, metal Si pellets were placed on a porous ceramic in a reduced-pressure atmosphere at 1,500° C., so that the metal Si was impregnated into the porous ceramic by a capillary phenomenon. Subsequently, after the atmospheric pressure was obtained by introduction of Ag, cooling was performed, so that a Si-impregnated SiC sintered body was obtained. This substrate had a porosity of 0.1 percent by volume or less measured by a mercury intrusion method using a mercury porosimeter. For $LaCrO_3$, lanthanum oxide and chromium oxide were mixed at an equivalent molar ratio, and this mixture was formed into a bar-shaped molded body (10× 20×35 mm) by press molding. This molded body was fired in an air atmosphere at 1,600° C. for 2 hours, so that a sintered body was obtained. The porosity of the Si-impregnated SiC sintered body and that of the composite oxide member measured by a mercury intrusion method using a mercury porosimeter were each 0.1 percent by volume or less.

Second Member

As the second member, a stainless steel material (SUS) was prepared. As the stainless steel material, a Cr—Fe-based alloy (SUS430) was used. This metal member was cut into a bar having a size of 3×4×20 mm, and this cut sample was used for experiments. The metal member had a porosity of 0.1 percent by volume or less measured by a mercury intrusion method using a mercury porosimeter.

Experimental Examples 1 to 23

In Experimental Examples 1 to 23, the formation was performed under the conditions shown in Table 1. In Experimental Examples 1 to 10, the composition ratio of Ni, which was the solute component, was changed. In Experimental Examples 11 to 13, a $Fe_2O_3$ phase used as the surface layer was not formed. In Experimental Example 14, the pore forming agent was added, and in Experimental Example 15, a Ni metal powder was used as a Ni source. In Experimental Examples 16 to 19, an element other than Ni was uses as the solute component. In Experimental Example 20, a Fe oxide was used as the joining material raw material. In Experimental Examples 21 to 23, the first member was changed.

(Identification of Crystal Phase and Calculation of Peak Shift)

Figure 8:
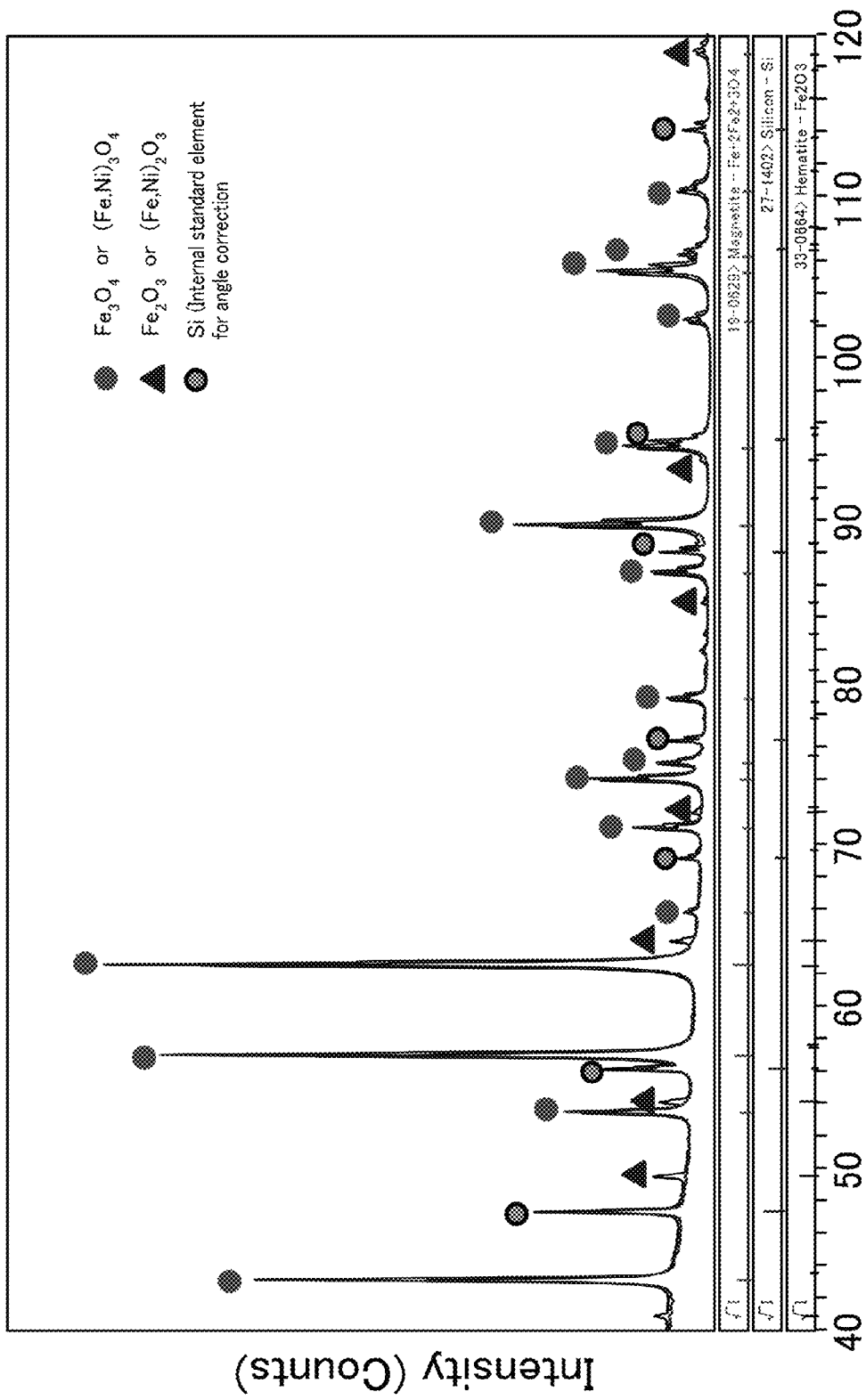
FIG. 8 shows x-ray diffraction measurement results of Experimental Examples 2 and 3.

By the use of a rotating anticathode-type x-ray diffraction apparatus (RINT, manufactured by Rigaku Corp.), an x-ray diffraction pattern of the joint portion was obtained. The x-ray diffraction measurement was performed using a CuKα line source at 50 kV, 300 mA, and 2θ=40° to 120°. The measurement was performed using a powder mixed with Si as the internal reference, a peak shift amount of the measurement sample was calculated using the peak of the (220) plane of Si as the reference peak and was used as an index indicating the degree of solid solution of a foreign element. The peak shift amount was obtained using the peak of the (410) plane of $Fe_2O_3$ and the (751) plane of $Fe_3O_4$. FIG. 8 shows the measurement results of the x-ray diffraction of Experimental Examples 2 and 3.

(Electrical Conductivity of Joining Material)

After a hole having a diameter of 5 mm was formed in a part of the joint portion of the joined body so as to expose a joining material. An Ag electrode having a diameter of 3 mm was baked on the exposed joining material portion, and the electrical resistance was measured by bringing a measurement needle into contact therewith. The resistance thus measured was converted into the volume resistivity using the electrode area and the distance between terminals, and the reciprocal thereof was obtained as the electrical conductivity. An electrical conductivity of 10 S/cm or more obtained as described above was ranked as "A", an electrical conductivity of 0.1 to less than 10 S/cm was ranked as "B", an electrical conductivity of 0.01 to less than 0.1 S/cm was ranked as "C", and an electrical conductivity of less than 0.01 S/cm or an electrical conductivity which could not be measured was ranked as "D".

(Bending Strength of Joining Material)

Figure 9:
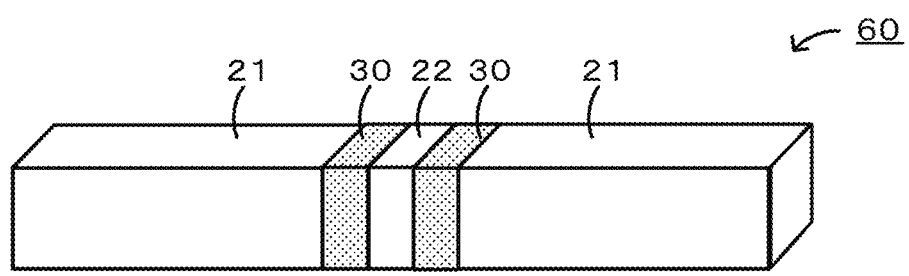
FIG. 9 is an explanatory view of a joined body 60 for mechanical strength measurement.

The joining strength of the joined body was evaluated by a four-point bending test in accordance with JIS-R1632. In Experimental Examples 1 to 20, after two Si-bonded SiC-made honeycomb bodies each obtained by cutting to have a size of 10×20×40 mm and a SUS430 plate having a thickness of 0.05 mm were joined together using the joining material described above to form the joined body, evaluation was performed by applying a load thereto. FIG. 9 is an explanatory view of a joined body 60 for mechanical strength measurement. The second member 22 is a SUS430 plate. In Experimental Example 21, after two Si-impregnated SiC-made honeycomb bodies each obtained by cutting to have a size of 10×20×40 mm and a SUS430 plate having a thickness of 0.05 mm were joined together using the joining material described above to form the joined body, evaluation was performed by applying a load thereto. In Experimental Example 22, after two $Al_2O_3$-made porous material bodies each obtained by cutting to have a size of 10×20×40 mm and a SUS430 plate having a thickness of 0.05 mm were joined together using the joining material described above to form the joined body, evaluation was performed by applying a load thereto. In Experimental Example 23, after two $LaCrO_3$-made dense material bodies each obtained by cutting to have a size of 10×20×40 mm and a SUS430 plate having a thickness of 0.05 mm were joined together using the joining material described above to form the joined body, evaluation was performed by applying a load thereto. As for the evaluation of the joining strength, a joining strength of 3.5 MPa or more was ranked as "A", a joining strength of 2.0 to less than 3.5 MPa was ranked as "B", and a joining strength of less than 2.0 MPa or a joining strength which could not be measured was ranked as "D". Incidentally, a joining strength of 3.5 MPa is a mechanical strength of a Si-bonded SiC sintered body, and hence, the joining strength of the sample ranked as "A" was higher than the mechanical strength described above.

(Heat Resistance Test)

In a heat resistance test, after the sample was held in the air at 850° C. for 24 hours, evaluation was performed by measuring the electrical conductivity and the bending strength of the joining material. As for the heat resistance evaluation, before and after the heat resistance test, when the joining strength or the electrical conductivity was ranked as "B" or more, and the evaluation thereof was not changed, this sample was ranked as "A". In the case in which the joining strength or the electrical conductivity was changed, although the joining strength and the electrical conductivity were changed, when the evaluations thereof were ranked as "B" or more, this sample was ranked as "B". Although the electrical conductivity was changed, when the evaluation thereof was ranked as "C" or more, this sample was ranked as "C". In addition, although the joining strength was changed, when the evaluation thereof was ranked as "D", and although the electrical conductivity was changed, when the evaluation thereof was ranked as "D", this sample was ranked as "D".

(Comprehensive Evaluation)

In accordance with the measurement results described above, the comprehensive evaluation of each sample was performed. The evaluation result of each joined body before the heat resistance test was regarded as the initial property evaluation. In this initial property evaluation, when the electrical conductivity was ranked as "A", and the joining strength was also ranked as "A", this sample was ranked as "A (excellent)". When the joining strength was ranked as "A", and the electrical conductivity was ranked as "B", or when the joining strength was ranked as "B", and the electrical conductivity was ranked as "A" or "B", this sample was ranked as "B (good)". When the joining strength or the electrical conductivity was ranked as "C", this sample was ranked as "C (fair)". In addition, when the joining strength or the electrical conductivity was ranked as "D", this sample was ranked as "D (no good)". The evaluation after the heat resistance test was performed in the same manner as described above. For the comprehensive evaluation, when the initial property evaluation and the heat resistance evaluation were ranked as "A", this sample was ranked as "A". In addition, when at least one of the initial property evaluation and the heat resistance evaluation was ranked as "B" or more, that is, when the two evaluations were ranked as "A" and "B", "B" and "A", or "B" and "B", this sample was ranked as "B". In addition, when at least one of the initial property evaluation and the heat resistance evaluation was ranked as "C", that is, when the two evaluations were ranked as "C" and "A", or "C" and "C", this sample was ranked as "C". Furthermore, when at least one of the initial property evaluation and the heat resistance evaluation was ranked as "D" or could not be measured, this sample was ranked as "D".

TABLE 1

| Experimental Examples | First Member | Second Member | Raw Material for Joining Material (Mixed)/mass % | | | | | | | | | | | Pore Forming Agent | Firing Atmosphere | Firing Temperature °C |
|---|---|---|---|---|---|---|---|---|---|---|---|---|---|---|---|---|
| | | | Fe Fine Powder | Fe Coarse Powder | Fe$_3$O$_4$ | TiO$_2$ | NiO | Ni | CuO | ZnO | Mn$_3$O$_4$ | CoO | Total | | | |
| 1 | Si-bonded SiC | SUS | 59.3 | 39.6 | | | 1.1 | | | | | | 100.0 | | Air | 750 |
| 2 | | | 60.0 | 40.0 | | | | | | | | | 100.0 | | Ar | 750 |
| 3 | | | 39.8 | 59.7 | | | 0.5 | | | | | | 100.0 | | Air | 750 |
| 4 | | | 38.8 | 58.2 | | 1.1 | 1.9 | | | | | | 100.0 | | Air | 750 |
| 5 | | | 39.2 | 58.8 | | | 2.0 | | | | | | 100.0 | | Air | 750 |
| 6 | | | 37.4 | 56.1 | | | 6.6 | | | | | | 100.0 | | Air | 750 |
| 7 | | | 34.8 | 52.2 | | | 12.9 | | | | | | 100.0 | | Air | 750 |
| 8 | | | 30.0 | 45.0 | | | 25.1 | | | | | | 100.0 | | Air | 750 |
| 9 | | | 26.4 | 39.7 | | 0.7 | 33.2 | | | | | | 100.0 | | Air | 750 |
| 10 | | | 19.9 | 29.8 | | 0.5 | 49.8 | | | | | | 100.0 | | Air | 750 |
| 11 | | | 39.2 | 58.8 | | | 2.0 | | | | | | 100.0 | | Ar | 750 |
| 12 | | | 37.4 | 56.1 | | | 6.6 | | | | | | 100.0 | | Ar | 750 |
| 13 | | | 34.8 | 52.2 | | | 12.9 | | | | | | 100.0 | | Ar | 750 |
| 14 | | | 39.2 | 58.8 | | | 2.0 | | | | | | 100.0 | 14.0 | Air | 750 |
| 15 | | | 39.3 | 58.9 | | | | 1.8 | | | | | 100.0 | | Air | 750 |
| 16 | | | 58.2 | 38.8 | | 1.1 | | | 2.0 | | | | 100.0 | | Air | 750 |
| 17 | | | 58.2 | 38.8 | | 1.1 | | | | 2.0 | | | 100.0 | | Air | 750 |
| 18 | | | 58.2 | 38.8 | | 1.1 | | | | | 2.0 | | 100.0 | | Air | 750 |
| 19 | | | 58.2 | 38.8 | | 1.1 | | | | | | 2.0 | 100.0 | | Air | 750 |
| 20 | | | | | 97 | | 3 | | | | | | 100.0 | | Ar | 750 |
| 21 | Si-impregnated SiC | | 39.2 | 58.8 | | | 2.0 | | | | | | 100.0 | | Air | 750 |
| 22 | Al$_2$O$_3$ | | 39.2 | 58.8 | | | 2.0 | | | | | | 100.0 | | Air | 750 |
| 23 | LaCrO$_3$ | | 39.2 | 58.8 | | | 2.0 | | | | | | 100.0 | | Air | 750 |

(Results and Discussion)

The measurement results of Experimental Examples 1 to 23 are collectively shown in Table 2. In Table 2, the crystal phases of the surface layer and the inner portion of the joint portion (oxide ceramic), the peak shift amount, the thickness and the porosity of the surface layer, the initial properties and the evaluation thereof, the characteristics after the heat resistance test and the evaluation thereof, and the comprehensive evaluation are collectively shown. As shown in Table 2, it was found that in Experimental Examples 3 to 8, 11 to 19, and 21 to 23, in each of which the peak shift of the Fe$_3$O$_4$ phase occurred (solute component was solid-dissolved), and no Fe$_2$MO$_4$ was contained, the electrical conductivity and the heat resistance were excellent. In this case, it was also found that, the second compound (TiO$_2$) and the pore forming agent may be contained, the surface layer may contain no Fe$_2$O$_3$ phase, and the member to be joined may be either a porous ceramic or a dense body. In addition, it was also found that when Cu, Zn, Mn, Co, and/or the like was used as a solute component instead of Ni, good results could be obtained.

TABLE 2

| Experimental Examples | Crystal Phase of Joining Material[1] | | Amount of Peak Shift | | Thickness of Surface Layer | Porosity of Surface Layer | Initial Properties | | | |
|---|---|---|---|---|---|---|---|---|---|---|
| | Surface Layer | Internal Portion | Fe$_3$O$_4$ ° | Fe$_2$O$_3$ ° | μm | % | Electrical Conductivity of Inside of Joining Material S/cm | Joining Strength Evaluation | Initial Evaluation | |
| 1 | A | B | None | | None | 3.8 | 0.5 | B | A | B |
| 2 | B | | | | None | None | 1.6 | B | A | B |
| 3 | C | D | 0.028 | 0.000 | 14.3 | 2.50 | 3.3 | B | A | B |
| 4 | C | D | 0.051 | 0.021 | 5.6 | 0.38 | 25.0 | A | A | A |
| 5 | C | D | 0.060 | 0.022 | 5.9 | 0.41 | 14.7 | A | A | A |
| 6 | C | D | 0.101 | 0.040 | 7.7 | 0.51 | 55.6 | A | A | A |
| 7 | C | D | 0.203 | 0.050 | 8.0 | 0.48 | 33.3 | A | A | A |
| 8 | C | D | 0.225 | 0.052 | 8.2 | 0.52 | 5.0 | B | B | B |
| 9 | A, D, E | | 0.218 | 0.048 | None | | 0.0 | D | D[2] | D |
| 10 | A, D, E | | 0.221 | 0.046 | | | 0.0 | D | D[2] | D |
| 11 | None | D | 0.102 | None | | | 26.6 | A | A | A |
| 12 | None | D | 0.202 | | | | 66.1 | A | A | A |
| 13 | None | D | 0.4064 | | | | 37.0 | A | A | A |
| 14 | C | D | 0.1 | None | 3.6 | None | 3.6 | B | B | B |
| 15 | C | D | 0.054 | 0.023 | 4.8 | 0.51 | 26.3 | A | A | A |
| 16 | F | G | 0.061 | 0.031 | 5.0 | 0.62 | 26.3 | A | A | A |

TABLE 2-continued

| | | | | | | | | | | |
|---|---|---|---|---|---|---|---|---|---|---|
| 17 | F | G | 0.058 | 0.028 | 5.1 | 0.58 | 27.8 | A | A | A |
| 18 | F | G | 0.050 | 0.021 | 4.8 | 0.60 | 22.2 | A | A | A |
| 19 | F | G | 0.051 | 0.022 | 5.3 | 0.61 | 23.8 | A | A | A |
| 20 | | | | | Not Joined | | | | | |
| 21 | C | D | 0.058 | 0.021 | 6.1 | 0.39 | 18.1 | A | A | A |
| 22 | C | D | 0.061 | 0.025 | 5.8 | 0.41 | 14.2 | A | A | A |
| 23 | C | D | 0.056 | 0.023 | 5.9 | 0.40 | 17.1 | A | A | A |

| | Properties After Heat Resistance Test | | | | | | |
|---|---|---|---|---|---|---|---|
| Experimental Examples | Crystal Phase Surface Layer | Crystal Phase Inner Portion | Thickness of Surface Layer μm | Electrical Conductivity of Joining Material S/cm | Electrical Conductivity of Joining Material Evaluation | Jioning Strength Evaluation | Evaluation After Heat Resistance Test Evaluation | Overall Evaluation |
| 1 | A | | None | 2.2E−05 | D | A | D | D |
| 2 | A | | None | 9.5E−04 | D | A | D | D |
| 3 | C | D | Unchanged | 3.6E+00 | B | A | A | B |
| 4 | C | D | | 2.4E+01 | A | A | A | A |
| 5 | C | D | | 1.5E+01 | A | A | A | A |
| 6 | C | D | | 5.0E+01 | A | A | A | A |
| 7 | C | D | | 3.6E+01 | A | A | A | A |
| 8 | C | D | | 4.3E+00 | B | B | A | B |
| 9 | A, E | | None | 1.0E−06 | D | D | D | D |
| 10 | A, E | | None | 1.0E−06 | D | D | D | D |
| 11 | C | A, D | 7.0 | 4.5E−01 | B | A | B | B |
| 12 | C | A, D | 9.2 | 1.2E+00 | B | A | B | B |
| 13 | C | A, D | 15.0 | 6.4E−01 | B | A | B | B |
| 14 | C | D | Unchanged | Unchanged | B | A | B | B |
| 15 | C | D | Unchanged | Unchanged | A | A | A | A |
| 16 | F | G | Unchanged | 2.4E+01 | A | A | A | A |
| 17 | F | G | | 2.2E+01 | A | A | A | A |
| 18 | F | G | | 6.4E−01 | B | A | B | B |
| 19 | F | G | | 6.4E−01 | B | A | B | B |
| 20 | | | | Not Joined | | | | D |
| 21 | C | D | Unchanged | 1.8E+01 | A | A | A | A |
| 22 | C | D | | 1.5E+01 | A | A | A | A |
| 23 | C | D | | 1.6E+01 | A | A | A | A |

[1] A: $Fe_2O_3$, B: $Fe_3O_4$, C: $(Fe, Ni)_2O_3$, D: $(Fe, Ni)_3O_4$, E: $Fe_2NiO_4$, F: $(Fe, M)_2O_3$, G: $(Fe, M)_3O_4$ (M is any one of Cu, Zn, Mn, and Co)
[2] Unmeasurable
3) E+01 represents $10^1$ and E−01 represents $10^{-1}$ Next, the formation of the electrode on the honeycomb structural body was investigated. As for the formation of the electrode, a thermal spraying method and a printing method were investigated. In this investigation, Experimental Examples 26 to 36 and 39 to 45 correspond to examples of the present invention, and Experimental Examples 24, 25, 37, and 38 correspond to comparative examples.

Experimental Examples 24 to 36

An electrode containing a $Fe_3O_4$ phase was formed on a honeycomb structural body by thermal spraying. As a thermal spraying raw material, $Fe_2O_3$ and NiO were fired in the air at 1,200° C. and pulverized into a powder by a ball mill, and the powder thus obtained was granulated to have a D90 of 197.8 μm, a D50 of 83.3 μm, and a D10 of 9.3 μm. As a substrate to be sprayed, a Si-bonded SiC-made honeycomb was used, and on an outer wall thereof, plasma spraying was performed in an air atmosphere under the conditions shown in Table 3. In this case, an electrode having a length of 65 mm, a width of 15 cm, and a thickness t of 12 to 25 μm was formed by thermal spraying on a Si-bonded SiC-made honeycomb having a diameter of 90 mm and a length L of 75 mm. In Experimental Examples 25 to 36, L1/L was 0.87, and X1/X was 0.053. In addition, in Experimental Example 24, no electrode was formed without performing thermal spraying, and for example, the electrical resistance of the partition wall of the outer circumference was measured.

TABLE 3

| | | | | | | | Thermal Spraying Raw Material | | | | | | | | |
|---|---|---|---|---|---|---|---|---|---|---|---|---|---|---|---|
| Experimental Examples[1] | Material of Substrate | Thermal Spraying Condition Gas Introduced L/min Ar | Thermal Spraying Condition Gas Introduced L/min $H_2$ | Thermal Spraying Condition Current A | Thermal Spraying Condition Voltage V | Crystal Phase of Raw Material Powder | Raw Material Component of Spraying Raw Material mass % $Fe_2O_3$ | $TiO_2$ | NiO | CuO | ZnO | $Mn_3O_4$ | CoO | Total | Particle Size Distribution <10 μm | Particle Size Distribution D50 |
| 24 | Si-bonded SiC | | | | | | None | | | | | | | | | |

TABLE 3-continued

| Experimental Examples[1] | Material of Substrate | Thermal Spraying Condition | | | | Thermal Spraying Raw Material | | | | | | | | | Particle Size Distribution | |
|---|---|---|---|---|---|---|---|---|---|---|---|---|---|---|---|---|
| | | Gas Introduced L/min | | Current A | Voltage V | Crystal Phase of Raw Material Powder | Raw Material Component of Spraying Raw Material mass % | | | | | | | | <10 μm | D50 |
| | | Ar | H₂ | | | | Fe₂O₃ | TiO₂ | NiO | CuO | ZnO | Mn₃O₄ | CoO | Total | | |
| 25 | Si-bonded SiC | 41 | 14 | 600 | 72 | Fe₂O₃ | 100 | | | | | | | 100 | 9.5 | 80 |
| 26 | Si-bonded SiC | 41 | 0 | 889 | 38 | (Fe, Ni)₂O₃ | 95.3 | | 4.7 | | | | | 100 | 9.8 | 85 |
| 27 | Si-bonded SiC | 41 | 4 | 600 | 59 | (Fe, Ni)₂O₃ | 95.3 | | 4.7 | | | | | 100 | 9.8 | 85 |
| 28 | Si-bonded SiC | 41 | 14 | 600 | 72 | (Fe, Ni)₂O₃ | 95.3 | | 4.7 | | | | | 100 | 9.8 | 85 |
| 29 | Si-bonded SiC | 41 | 14 | 600 | 72 | (Fe, Ni)₂O₃ | 98.6 | | 1.4 | | | | | 100 | 9.5 | 75 |
| 30 | Si-bonded SiC | 41 | 14 | 600 | 72 | (Fe, Ni)₂O₃ | 90.6 | | 9.4 | | | | | 100 | 8.5 | 70 |
| 31 | Si-bonded SiC | 41 | 14 | 600 | 72 | Fe₂O₃, NiO | 95.3 | | 4.7 | | | | | 100 | 6.5 | 60 |
| 32 | Si-bonded SiC | 41 | 14 | 600 | 72 | Fe₂O₃, TiO₂, NiO | 97.6 | 1.0 | 1.4 | | | | | 100 | 8.5 | 70 |
| 33 | Si-bonded SiC | 41 | 14 | 600 | 72 | Fe₂O₃, CuO | 98.6 | | | 1.4 | | | | 100 | 8.5 | 70 |
| 34 | Si-bonded SiC | 41 | 14 | 600 | 72 | Fe₂O₃, ZnO | 98.6 | | | | 1.4 | | | 100 | 8.5 | 70 |
| 35 | Si-bonded SiC | 41 | 14 | 600 | 72 | Fe₂O₃, Mn₃O₄ | 98.6 | | | | | 1.4 | | 100 | 8.5 | 70 |
| 36 | Si-bonded SiC | 41 | 14 | 600 | 72 | Fe₂O₃, CoO | 98.6 | | | | | | 1.4 | 100 | 8.5 | 70 |

[1]Examples in which elextrode was formed by thermal spraying

Experimental Examples 37 to 45

An electrode containing a $Fe_3O_4$ phase was formed on a honeycomb structural body by printing. As a printing paste, a mixture formed by using a Fe metal powder, NiO, a polyvinyl butyral) (PVB), and terpineol was used. This paste was printed to have a shape of 65 mm×15 mm×0.2 mm (thickness t) on a Si-bonded SiC-made honeycomb having a diameter of 90 mm and a length L of 75 mm. After drying was performed in the air at 80° C. for 1 hour, firing was performed in Ar at 750° C. The outline of the formation is shown in Table 4. In Experimental Examples 37 to 45, L1/L was 0.87, and X1/X was 0.053.

TABLE 4

| Experimental Examples[1] | Material of Substrate | Raw Material/mass % | | | | | Firing Atmosphere | Firing Temperature ° C. |
|---|---|---|---|---|---|---|---|---|
| | | Fe | NiO | TiO₂ | Ni | Total | | |
| 37 | Si-bonded SiC | 100.0 | | | | 100 | Ar | 750 |
| 38 | Si-bonded SiC | 98.9 | | 1.1 | | 100 | Air | 750 |
| 39 | Si-bonded SiC | 99.5 | 0.5 | | | 100 | Ar | 750 |
| 40 | Si-bonded SiC | 99.5 | 0.5 | | | 100 | Air | 750 |
| 41 | Si-bonded SiC | 98.0 | 2 | | | 100 | Air | 750 |
| 42 | Si-bonded SiC | 93.4 | 6.6 | | | 100 | Air | 750 |
| 43 | Si-bonded SiC | 87.1 | 12.9 | | | 100 | Air | 750 |
| 44 | Si-bonded SiC | 97.0 | 1.9 | 1.1 | | 100 | Air | 750 |
| 45 | Si-bonded SiC | 98.2 | | | 1.8 | 100 | Air | 750 |

[1]Examples in which elextrode was formed by printing (Measurement of Electrical Resistance)

In Experimental Examples 24 to 45 in which the electrode was formed by thermal spraying or printing, after a hole having a diameter of 2 mm was formed in a part of a substrate having a size of 20 mm×20 mm, Ag was baked as the electrode, and the electrical resistance of an electrode material (oxide ceramic containing a $Fe_3O_4$ phase) was measured by a two-terminal method. In addition, the electrical resistance of the honeycomb structural body was also measured. For the electrical resistance measurement of the honeycomb structural body, Al foil was pushed to an outer wall of the honeycomb or the electrode portion, and measurement was performed by a two-terminal method.

(Heat Resistance Test)

The heat resistance test was performed on the samples of Experimental Examples 24 to 45. In the heat resistance test, each sample was left in the air at 850° C. for 24 hours. After the heat resistance test, for example, the electrical resistance was measured.

(Measurement of Heat Generation Distribution of Honeycomb Structural Body)

After Al foil was pushed to an outer wall of a honeycomb having a diameter of 90 mm and a length L of 75 mm or the electrode portion, an electricity of 2.25 kW was supplied for 25 seconds, and the heat generation distribution was measured by a thermography camera.

(Results and Discussion)

The measurement results of Experimental Examples 24 to 36 are collectively shown in Table 5, and the measurement results of Experimental Examples 37 to 45 are collectively shown in Table 6. In Experimental Example 24, although the honeycomb structural body was provided with no electrode, the change in electrical resistance before and after the heat resistance test was not observed. On the other hand, in Experimental Example 24, both before and after the heat resistance test, irregularities were generated in the heat generation distribution. In Experimental Example 25, an electrode of a $Fe_3O_4$ phase in which Ni was not solid-dissolved was formed. It was found that in Experimental Example 25, although the electrode was provided, the heat resistance was inferior. In this Experimental Example 25, although no irregularities were generated in heat generation distribution before the heat resistance test, after the heat resistance test, the electrical resistance was increased, and irregularities were also generated in the heat generation distribution. That is, it is believed that the oxidation resistance was still not sufficient. On the other hand, in Experimental Examples 26 to 36, before and after the heat resistance test, the change in electrical resistance was not observed, and irregularities were not generated in the heat generation distribution. In Experimental Examples 26 and 27 in which the thermal spraying conditions, such as the mixing gas ratio and the plasma energy, were changed, results similar to each other could be obtained. In Experimental Examples 28 to 30 in which the composition range of the electrode was changed, it was found that preferable results could be obtained. Furthermore, in Experimental Examples 31 and 32 in which the thermal spraying raw material was changed, results similar to each other could also be obtained. Furthermore, in Experimental Examples 33 to 36 in which the solute component was changed, results similar to each other could also be obtained.

TABLE 5

| Experimental Examples[1] | Electrode After Thermal Spraying | | | | Amount of Peak Shift of Electrode ° | Electrical Resistance of Electrode Material | | Electrical Resistance of Honeycomb Structural Body/Ω | Change in Electrical Resistance of Honeycomb Structural Body After Heat Resistance Test/Ω[2] | Local Heat Generation in Honeycomb Structural Body | |
|---|---|---|---|---|---|---|---|---|---|---|---|
| | Material | Thickness μm | Width mm | Length mm | | Before Heat Resistance Test Ωcm | After Heat Resistance Test Ωcm | | | Before Heat Resistance Test | After Heat Resistance Test |
| 24 | | | | | None | | | 9.0E+01 | A | Present | Present |
| 25 | $Fe_3O_4$ | 20 | 15 | 65 | None | 6.2E−01 | 1.1E+03 | 7.2E+01 | B | None | Present |
| 26 | $(Fe, Ni)_3O_4$ | 12 | 15 | 65 | 0.101 | 4.0E−02 | 4.2E−02 | 6.0E+01 | A | None | None |
| 27 | $(Fe, Ni)_3O_4$ | 18 | 15 | 65 | 0.101 | 4.0E−02 | 4.2E−02 | 6.2E+01 | A | None | None |
| 28 | $(Fe, Ni)_3O_4$ | 23 | 15 | 65 | 0.101 | 3.0E−01 | 2.8E−01 | 6.5E+01 | A | None | None |
| 29 | $(Fe, Ni)_3O_4$ | 20 | 15 | 65 | 0.06 | 4.0E−02 | 4.2E−02 | 6.1E+01 | A | None | None |
| 30 | $(Fe, Ni)_3O_4$ | 25 | 15 | 65 | 0.2032 | 3.0E−02 | 2.8E−02 | 6.5E+01 | A | None | None |
| 31 | $(Fe, Ni)_3O_4$ | 25 | 15 | 65 | 0.101 | 6.8E−02 | 6.5E−02 | 6.2E+01 | A | None | None |
| 32 | $(Fe, Ti, Ni)_3O_4$ | 20 | 15 | 65 | 0.141 | 4.0E−02 | 4.2E−02 | 6.0E+01 | A | None | None |
| 33 | $(Fe, Cu)_3O_4$ | 22 | 15 | 65 | 0.031 | 3.8E−02 | 4.2E−02 | 6.0E+01 | A | None | None |
| 34 | $(Fe, Zn)_3O_4$ | 22 | 15 | 65 | 0.028 | 3.6E−02 | 4.5E−02 | 6.1E+01 | A | None | None |
| 35 | $(Fe, Mn)_3O_4$ | 21 | 15 | 65 | 0.021 | 4.5E−02 | 1.6E+00 | 6.1E+01 | A | None | None |
| 36 | $(Fe, Co)_3O_4$ | 23 | 15 | 65 | 0.022 | 4.2E−02 | 1.6E+00 | 6.0E+01 | A | None | None |

[1] Examples in which elextrode was formed by thermal spraying
[2] A: Change by 1 digit Ω or less, B: change by 2 digits or more
3) E+01 represents $10^1$ and E−01 represents $10^{-1}$ As shown in Table 6, in Experimental Examples 37 and 38 in which the electrode was formed by a printing method, although the electrode was provided, after the heat resistance test, the electrical resistance was increased, and irregularities were also generated in the heat generation distribution; hence, it is believed that the heat resistance was still not sufficient. On the other hand, in Experimental Examples 39 to 45, before and after the heat resistance test, the change in electrical resistance was not observed, and no irregularities were generated in the heat generation distribution. Incidentally, in Experimental Example 39, an electrode firing atmosphere was changed; in Experimental Examples 40 to 43, the composition range of Ni of the electrode material was changed; in Experimental Example 44, Ti was added besides Ni; and in Experimental Example 45, the raw material was changed.

TABLE 6

| Experimental Examples[1] | Electrode | | | | Electrical Resistance of Electrode Material | | Electrical Resistance of Honeycomb Structural Body | Change in Electrical Resistance of Honeycomb Structural Body After Heat Resistance Test/Ω[2] | Local Heat Generation in Honeycomb Structural Body | |
|---|---|---|---|---|---|---|---|---|---|---|
| | | | | | Before Heat Resistance Test Ωcm | After Heat Resistance Test Ωcm | | | Before Heat Resistance Test | After Heat Resistance Test |
| | Material | Thickness μm | Width mm | Length mm | | | | | | |
| 37 | $Fe_3O_4$ | 160 | 15 | 65 | 6.2E−01 | 4.6E+04 | 7.1E+01 | B | None | Present |
| 38 | $Fe_2O_3$, $Fe_3O_4$, $TiO_2$ | 220 | 15 | 65 | 2.0E+00 | 1.1E+03 | 7.9E+01 | B | None | Present |
| 39 | $(Fe, Ni)_3O_4$ | 150 | 15 | 65 | 4.0E−02 | 4.0E−02 | 6.0E+01 | A | None | None |
| 40 | $(Fe, Ni)_3O_4$ | 220 | 15 | 65 | 3.3E−01 | 3.6E−01 | 6.1E+01 | A | None | None |
| 41 | $(Fe, Ni)_3O_4$ | 210 | 15 | 65 | 6.8E−02 | 6.5E−02 | 6.1E+01 | A | None | None |
| 42 | $(Fe, Ni)_3O_4$ | 230 | 15 | 65 | 1.8E−02 | 2.0E−02 | 6.0E+01 | A | None | None |
| 43 | $(Fe, Ni)_3O_4$ | 220 | 15 | 65 | 3.0E−02 | 2.8E−02 | 6.1E+01 | A | None | None |
| 44 | $(Fe, Ni, Ti)_3O_4$ | 210 | 15 | 65 | 4.0E−02 | 4.0E−02 | 6.2E+01 | A | None | None |
| 45 | $(Fe, Ni)_3O_4$ | 220 | 15 | 65 | 2.6E+01 | 2.6E+01 | 6.0E+01 | A | None | None |

[1] Examples in which elextrode was formed by printing
[2] A: Change by 1 digit Ω or less, B: change by 2 digits or more
3) E+01 represents $10^1$ and E−01 represents $10^{-1}$ It was found that in an electrode formed of an oxide ceramic containing a $Fe_3O_4$ phase in which a solute component was solid-dissolved, when the electrode size was 15 mm×65 mm, the thermal stability and the oxidation resistance were further improved, and the heat generation distribution could be made more uniform.

It is to be naturally understood that the present invention is not limited at all to the examples described above and may by performed in various modes without departing from the technical scope of the present invention.

What is claimed is:

1. A joined body comprising:
   a first member;
   a second member; and
   a joint portion which is formed of an oxide ceramic containing a $Fe_3O_4$ phase in which a solute component capable of forming a spinel-type oxide with Fe is solid-dissolved and which joins the first member and the second member,
   wherein the oxide ceramic contains the solute component in a range of 0.5 to 30 percent by mass,
   wherein the first member is an electrode terminal protrusion portion formed to have a convex shape or a concave shape,
   the second member is a metal terminal portion formed so that a portion to be joined to the electrode terminal protrusion portion has a concave shape or a convex shape complementary to the shape of the electrode terminal protrusion portion, and
   the joint portion electrically connects the electrode terminal protrusion portion and the metal terminal portion at a portion between the concave shape and the convex shape at which the electrode terminal protrusion portion and the metal terminal portion are engaged with each other.

2. The joined body according to claim 1, wherein the oxide ceramic includes a Fe oxide which contains at least one of Mn, Co, Ni, Cu, and Zn as the solute component.

3. The joined body according to claim 1, wherein the oxide ceramic contains Ni as the solute component, and the peak shift of the (751) plane of $Fe_3O_4$ measured by x-ray diffraction using the CuKα line is 0.02° or more.

4. The joined body according to claim 1, wherein the oxide ceramic further contains a $Fe_2O_3$ phase and contains Ni as the solute component, and the peak shift of the (410) plane of $Fe_2O_3$ measured by x-ray diffraction using the CuKα line is 0.02° or more.

5. The joined body according to claim 1, wherein the joint portion includes a surface layer composed of a $Fe_2O_3$ phase and an inner portion composed of a $Fe_3O_4$ phase.

6. The joined body according to claim 5, wherein the surface layer of the joint portion has a thickness of 15 μm or less.

7. The joined body according to claim 1, wherein the oxide ceramic contains Fe as a first component and at least one of Si, Zr, Ti, Sn, Nb, Sb, and Ta as a second component.

8. The joined body according to claim 1, wherein the difference in thermal expansion coefficient between the first member and the second member is 4.0 ppm/K or more.

9. The joined body according to claim 1, wherein the joint portion has an electrical conductivity of $1×10^{-1}$ (S/cm) or more.

10. The joined body according to claim 1, wherein the first member includes a porous material.

11. The joined body according to claim 1, wherein the first member includes a Si-bonded SiC material.

12. The joined body according to claim 1, wherein the first member includes a material containing a silicide.

13. The joined body according to claim 1,
   wherein the electrode terminal protrusion portion and the metal terminal portion form no space between a protruding front end of the convex shape and a bottom part of the concave shape which is complementary thereto, and
   the joint portion electrically connects the electrode terminal protrusion portion and the metal terminal portion at side surface portions of the concave shape and the convex shape at which the electrode terminal protrusion portion and the metal terminal portion are engaged with each other.

14. The joined body according to claim 1,
   wherein the electrode terminal protrusion portion is a part of a honeycomb structural body including a partition wall formed of a porous ceramic which forms and defines a plurality of cells, the cells each functioning as a flow path of a fluid and extending from one end surface to the other end surface and an outer circumference wall formed along the outermost circumference.

15. The joined body according to claim 1, wherein the first member includes the oxide ceramic.

16. The joined body according to claim 1,
wherein the first member is an electrode formed on an outer surface of a honeycomb structural body including a partition wall formed of a porous ceramic which forms and defines a plurality of cells each functioning as a flow path of a fluid and extending from one end surface to the other end surface and an outer circumference wall formed along the outermost circumference.

17. A method for manufacturing a joined body in which a first member and a second member is joined to each other, the method comprising:
a step of forming a laminate in which between the first member and the second member, a joint layer including a Fe metal powder and a solute component powder which contains a solute component capable of forming a spinel-type oxide with Fe; and a joining step of firing the laminate in a temperature range lower than the melting point of a Fe oxide to form an oxide ceramic functioning as a joint portion which joins the first member and the second member,
wherein the oxide ceramic contains the solute component in a range of 0.5 to 30 percent by mass,
wherein the first member is an electrode terminal protrusion portion formed to have a convex shape or a concave shape,
the second member is a metal terminal portion formed so that a portion to be joined to the electrode terminal protrusion portion has a concave shape or a convex shape complementary to the shape of the electrode terminal protrusion portion, and
the joint portion electrically connects the electrode terminal protrusion portion and the metal terminal portion at a portion between the concave shape and the convex shape at which the electrode terminal protrusion portion and the metal terminal portion are engaged with each other.

18. The method for manufacturing a joined body according to claim 17, wherein in the joining step, the joint portion is formed by firing the laminate in the air or by firing the laminate in the air after a heat treatment is performed in a non-oxidizing atmosphere.

19. A method for manufacturing a joined body comprising:
a thermal spraying step of melting a raw material powder including a Fe raw material powder which contains at least one of a Fe metal powder and a Fe oxide powder and a solute component powder which contains a solute component capable of forming a spinel-type oxide with Fe, and thermal spraying the melt to form a joint portion which joins a first member and a second member adjacent thereto and which is formed of an oxide ceramic containing a $Fe_3O_4$ phase in which the solute component is solid-dissolved,
wherein the oxide ceramic contains the solute component in a range of 0.5 to 30 percent by mass,
wherein the first member is an electrode terminal protrusion portion formed to have a convex shape or a concave shape,
the second member is a metal terminal portion formed so that a portion to be joined to the electrode terminal protrusion portion has a concave shape or a convex shape complementary to the shape of the electrode terminal protrusion portion, and
the joint portion electrically connects the electrode terminal protrusion portion and the metal terminal portion at a portion between the concave shape and the convex shape at which the electrode terminal protrusion portion and the metal terminal portion are engaged with each other.

\* \* \* \* \*